(12) United States Patent
Robertson et al.

(10) Patent No.: US 9,355,569 B2
(45) Date of Patent: May 31, 2016

(54) SYSTEMS, METHODS, AND COMPUTER PROGRAM PRODUCTS FOR PROVIDING A LEARNING AID USING PICTORIAL MNEMONICS

(71) Applicants: Kenneth Robertson, Lakeside, AZ (US); Ron Robertson, Lakeside, AZ (US); Adeel Yang, Chandler, AZ (US); Nicole Pasteur, Scottsdale, AZ (US)

(72) Inventors: Kenneth Robertson, Lakeside, AZ (US); Ron Robertson, Lakeside, AZ (US); Adeel Yang, Chandler, AZ (US); Nicole Pasteur, Scottsdale, AZ (US)

(73) Assignee: Picmonic Inc., Tempe, AZ (US)

( * ) Notice: Subject to any disclaimer, the term of this patent is extended or adjusted under 35 U.S.C. 154(b) by 141 days.

(21) Appl. No.: 14/016,016

(22) Filed: Aug. 30, 2013

(65) Prior Publication Data

US 2014/0072944 A1    Mar. 13, 2014

Related U.S. Application Data

(60) Provisional application No. 61/695,094, filed on Aug. 30, 2012.

(51) Int. Cl.
G09B 5/00    (2006.01)
G09B 5/02    (2006.01)

(52) U.S. Cl.
CPC ........................................ *G09B 5/02* (2013.01)

(58) Field of Classification Search
USPC .................. 434/262, 308, 322, 323, 350, 365
See application file for complete search history.

(56) References Cited

U.S. PATENT DOCUMENTS

| | | | |
|---|---|---|---|
| 8,602,791 B2 * | 12/2013 | Weatherhead | 434/236 |
| 8,992,232 B2 * | 3/2015 | Berry et al. | 434/267 |
| 2005/0158697 A1 * | 7/2005 | Nelson et al. | 434/350 |
| 2009/0317781 A1 * | 12/2009 | Oosthuizen | 434/267 |
| 2012/0100517 A1 * | 4/2012 | Bowditch et al. | 434/267 |
| 2012/0208161 A1 * | 8/2012 | Takata et al. | 434/262 |
| 2014/0038152 A1 * | 2/2014 | Micieli | 434/267 |

* cited by examiner

*Primary Examiner* — Kesha Frisby
(74) *Attorney, Agent, or Firm* — Skaar Ulbrich Macari, P.A.

(57) ABSTRACT

A system, method and computer program product for providing a learning aid using pictorial mnemonics. The method can include receiving a first input including a selection of a content topic. The method further includes displaying a first pictorial mnemonic associated with the selected topic, wherein the first pictorial mnemonic comprises one or more sub-images, and a list of one or more attributes, wherein each attribute is associated with a corresponding sub-image.

17 Claims, 21 Drawing Sheets

Fig. 7

PICMONIC

NIEMANN-PICK DISEASE
*PICK IN MAN'S KNEE*

[SUMMARY] [NOTES/POSTS]

1. INCREASE PREVALENCE IN JEWISH POPULATIONS
   *YARMUTKE (YAMAKA)*
2. SPHINGOMYELINASE
   *SPHINX-ON-MY-LOG*
3. CHERRY RED MACULA
   *CHERRY EYES*
4. HEPATOSPLENOMEGALY
   *BALLOON LIVER AND SPLEEN*
5. NEURODEGENERATION
   *DEGENERATING NERVE ARM*
6. FOAM CELLS
   *FOAM*

[STORE] [LIBRARY] [LEARN]

RELEVANCE     REFERENCE
BIOCHEMISTRY STEP 1, STEP 2,    FA 2012 116.2013 112, GOLJAN PG. 215

NIEMANN PICK DISEASE IS A LYSOSOMAL STORAGE DISEASE CAUSED BY A DEFECT IN THE ENZYME SPHINGOMYELINASE SEEN IN THE EASTERN EUROPEAN ASHKENAZI JEWISH POPULATION. DEFECT OF THIS ENZYME CAUSES ACCUMULATION OF SPHINGOMYELIN IN VARIOUS ORGANS INCLUDING THE RETINA, THE CENTRAL NERVOUS SYSTEM, AND THE LIVER AND SPLEEN. ON HISTOLOGY, NIEMANN PICK DISEASE IS CHARACTERIZED BY FOAM CELLS, WHICH ARE NUMEROUS SMALL VACUOLES FILLED WITH LIPIDS. THE MOST COMMON TYPE OF NIEMANN PICK DISEASE HAS AN EXTREMELY POOR PROGNOSIS WITH THE MAJORITY OF CASES OF BEING 18 MONTHS OF AGE.

STACK SUMMARY
MEDICAL (TRIAL)

CATCH A GLIMPSE OF WHAT PICMONIC OFFERS. CARDS IN THE FREE TRIAL COVER CATEGORIES INCLUDING HEMATOLOGY AND ONCOLOGY, MICROBIOLOGY, MUSCULOSKELETAL SYSTEM, BIOCHEMISTRY, NERVOUS SYSTEM AND PHARMACOLOGY. 10 TOPICS COVER AN OVERWHELMING AMOUNT OF HIGH-YIELD INFORMATION, AND IT'S ALL READY FOR YOU TO MASTER FOR FREE.

MEDICAL (TRIAL)
└─ NIEMANN-PICK DISEASE

DEFINITIONS: [ON] [OFF]   [TOPIC]   CONFIDENCE: ① ② ③ ④ ⑤
CARD 1 OF 1
MEDICAL (TRIAL)

Fig. 15

SYSTEMS, METHODS, AND COMPUTER PROGRAM PRODUCTS FOR PROVIDING A LEARNING AID USING PICTORIAL MNEMONICS

PRIORITY

This Application claims priority to and the benefit of U.S. Provisional Patent Application No. 61/695,094, filed Aug. 30, 2012, which is incorporated herein by reference in its entirety.

TECHNICAL FIELD

The present invention relates generally to systems, methods, and computer programs for providing a learning aid, and more particularly, to systems, methods, and computer programs for providing a learning aid or tool using pictorial mnemonics associated with a content topic.

BACKGROUND OF THE INVENTION

Students preparing for examinations, including entrance and board exams, must frequently memorize laundry lists of words, meanings, definitions, concepts, elements, relationships, associations, and examples. Many different study techniques have been developed to assist a student or individual with memorizing such lists. One such technique utilizes "pictorial mnemonics" or visual representations of study lists, as a learning aid. A pictorial mnemonic can assemble several different elements or attributes into a single vivid illustration or snapshot. Thus, one quick snapshot or pictorial mnemonic can allow a student to associate several attributes with a general topic.

Scientific research supports the utility and efficacy of pictorial mnemonics as learning aids. Several attempts have been made to incorporate pictorial mnemonics into commercialized products. These attempts include the use of sketches, drawings, picture books, flashcards, and other forms of pictorial mnemonics. These products, however, have been unsuccessful in creating an effective delivery system and method for explaining what the pictures represent. In previous products, many students have found it difficult to interpret a pictorial mnemonic when presented with the pictorial mnemonic for the first time. Prior products have failed to bridge the gap between what students are seeing and what the images represent and, thus, those using such products have not been able to leverage the utility of pictorial mnemonics as an effective or efficient learning aid. Instead, students lose interest in the images and the value of the images and the visual learning process is lost.

Accordingly, there exists a need for an electronic and interactive learning aid that provides users with a unique and powerful content delivery system that effectively conveys the meaning of terms, phrases, conditions, etc., as a learning aid.

SUMMARY OF THE INVENTION

Particular embodiments of the present invention are directed to systems, methods, and computer program products for providing a learning aid or tool using pictorial mnemonics.

In one embodiment, a method for providing a learning aid using pictorial mnemonics includes receiving a first input including a selection of a content topic. The method further includes displaying a first pictorial mnemonic associated with the selected topic, wherein the first pictorial mnemonic comprises one or more sub-images, and a list of one or more attributes, wherein each attribute is associated with a corresponding sub-image. The method can include receiving a second input including a selection of one of the attributes. The method further includes displaying or highlighting, based on the input, the sub-image associated with the selected attribute, and outputting a description including the relationship between the selected topic, the sub-image and the selected attribute.

In another embodiment, a device for providing a learning aid using a pictorial mnemonic includes a processor, a memory coupled to the processor, an input device coupled to the processor, and an output device coupled to the processor. The processor is configured to receive on the input device a first input including a selection of a content topic. The processor is configured to display on an output device a first pictorial mnemonic associated with the selected topic, wherein the first pictorial mnemonic comprises one or more sub-images, and a list of one or more two attributes, wherein each attribute is associated with a corresponding sub-image. The processor is configured to receive from the input device a second input including a selection of one of the attributes. The processor is further configured to display or highlight on the output device, based on the second input, the sub-image associated with the selected attribute. The processor can output to the output device a description including the relationship between the selected topic, the sub-image, and the selected attribute.

Each attribute corresponds to a sub-image. The sub-image can be a visual representation of the attribute. In another aspect, the sub-image can be a representation of an item, object or thing that sounds like the attribute. In yet another aspect, the sub-image can be a visual representation of an item, object or thing that is associated with the attribute.

In certain embodiments of the present invention, the sub-images can be displayed such that the images interact with one another. The sub-images can tell a story in pictures or form a narrative within the pictorial mnemonic. The sub-images can form a cohesive larger image or pictorial mnemonic.

Each pictorial mnemonic has a set of attributes, each of which can contain details, including its hotspot coordinates within the pictorial mnemonic. Each pictorial mnemonic can be stored and presented or displayed as a "card," and a plurality of cards make up a "stack." A stack can be a subcategory of multiple cards within a broader category. For instance, exemplary broad categories under medicine can include biochemistry, the cardiovascular system, the endocrine system, immunology, microbiology, the nervous system, pharmacology, the reproductive system, the renal system, etc. Each of these categories can include stack databases that delve even deeper into the category. For example, the biochemistry category can include stack databases on enzyme deficiencies, glycogen storage, vitamins, and the like. Further, exemplary cards within a stack, such as the vitamins stack, can include one or more cards directed to zinc deficiency, niacin, vitamin A toxicity, thiamine, riboflavin, etc. Other category, stack and card content or topics can be implemented without deviating from the scope of the present invention.

As users engage with the software application, they will have a chance to study predetermined sets of pictorial mnemonics or to create their own sets based on their own preferences and filters. Each study session will generally include a number of pictorial mnemonics and will be tracked for statistical data and as part of the user's overall history, or performance. The user can also partake in a game or quiz. Each game can include a list of one to many users, a set of pictorial mnemonics, and the results of the game. Each pictorial mnemonic will also have a list of associated pictorial mnemonics as it relates to game play.

A library mode presents the user with a database of selectable topics for studying or learning in the learn mode, as well as selections for additional topics and materials that can be purchased or otherwise obtained via the store mode. Again, stacks of cards are displayed for selection within broader categories.

The learn mode can be the primary mode in certain embodiments of the present invention, and provides the user with access to the various topics, images, sub-images, and attributes disclosed herein for assisting the user in learning the material via the pictorial mnemonics provided.

The game mode allows users to test themselves on topics presented and learned in the learn mode, via a gamified quiz. The user can select particular topics for a quiz, or can have the computer generate the topics based on the selection of multiple topics, or via a random selection generator in communication with the user's library database.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and to enable a person skilled in the pertinent art to make and use the embodiments disclosed herein. In the drawings, like reference numbers indicate identical or functionally similar elements.

FIGS. 5-7 are images of library mode screens in use, in accordance with exemplary embodiments of the present invention.

FIG. 15 is an image of a learn mode screen in use, displaying a selected summary field, in accordance with exemplary embodiments of the present invention.

DETAILED DESCRIPTION

Referring to FIGS. 1-21, exemplary systems, methods, and computer program products for providing a learning aid or tool using pictorial mnemonics are provided. A "pictorial mnemonic" as described herein is a visual representation of one or more attributes (e.g., at least two in various embodiments) or fact hotspots.

Figure 10:
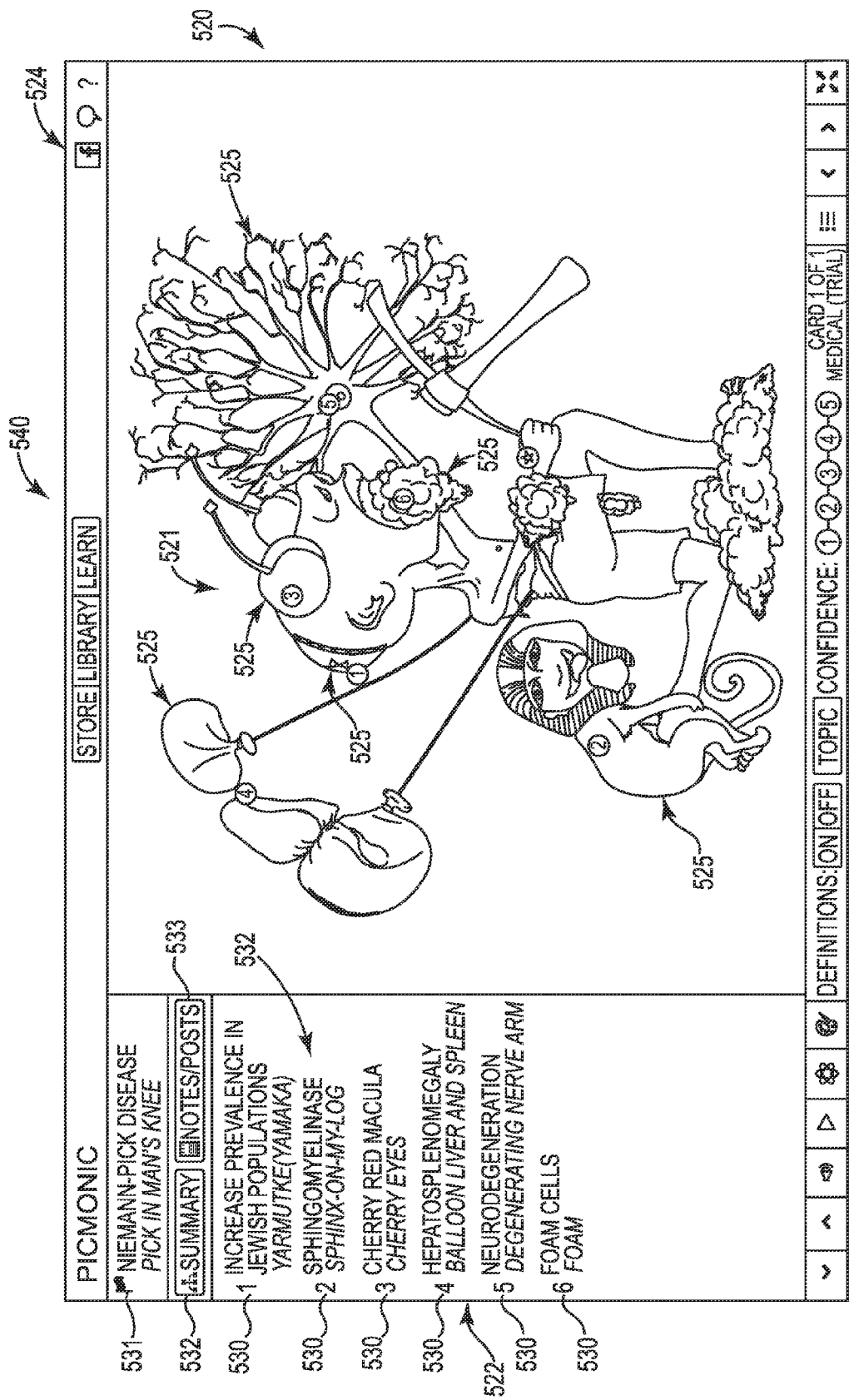
FIG. 10 is an image of a learn mode screen in use, including a pictorial mnemonic with a plurality of attributes and sub-images, in accordance with exemplary embodiments of the present invention.

A pictorial mnemonic includes one or more sub-images (e.g., at least two in various embodiments), each corresponding to an attribute or hotspot. As described herein, an "attribute" may be, for example, a fact, a word, list, element or concept related to a more general topic. For instance, as shown in FIG. 10, a list of attributes or symptoms could include "cherry red macula, "neurodegeneration," "enlarged liver and spleen," "foam cells," and "sphingomyelinase deficiency" related to the topic, "Niemann-Pick disease." In this example, the attributes or hotspots are symptoms that are related to a disease topic. Each of the attributes or symptoms is visually represented with a sub-image in the pictorial mnemonic for the topic of "Niemann-Pick disease." For instance, the "cherry red macula" attribute can correspond with a sub-image of a pair of cherries in a man's eyes, "foam cells" can correspond to a sub-image of foam coming from the man's mouth, and "sphingomyelinase deficiency" can correspond to a sub-image of a sphinx on the man's legs.

Various content topics can include common attributes and, therefore, common sub-images. For instance, numerous medical-related topics may include "fever" as an attribute or symptom for a disease or illness. As such, a recurring sub-image can be used (stored and displayed) to represent the "fever" attribute in multiple pictorial mnemonics. For instance, the "fever" sub-image can be an "orange beaver" image. Using a consistent and recurring attribute and sub-image when applicable further assists the user in retaining and learning the subject topic based on familiarity, frequency, and common association.

The pictorial mnemonics provide a learning tool that causes the user to use their imagination to develop mental images and associations, wherein a picturable equivalent from a standardized visual vocabulary is presented as a sub-image corresponding with the attribute term or phrase.

In one embodiment, a method for providing a learning aid using pictorial mnemonics includes receiving and storing a first input including a selection of a content topic. The method further includes displaying a first pictorial mnemonic associated with the selected topic, wherein the first pictorial mnemonic comprises one or more sub-images, and a list of one or more attributes, wherein each attribute is associated with a corresponding sub-image. The method can include receiving a second input including a selection of one of the attributes.

The method further includes displaying or highlighting, based on the input, the sub-image associated with the selected attribute, and outputting a description including the relationship between the selected topic, the sub-image and the selected attribute.

In another embodiment, a device for providing a learning aid using a pictorial mnemonic includes a processor, a memory coupled to the processor, an input device coupled to the processor, and an output device coupled to the processor. The processor is configured to receive on the input device a first input including a selection of a content topic. The processor is configured to display on an output device a first pictorial mnemonic associated with the selected topic, wherein the first pictorial mnemonic comprises one or more sub-images, and a list of one or more two attributes, wherein each attribute is associated with a corresponding sub-image. The processor is configured to receive from the input device a second input including a selection of one of the attributes. The processor is further configured to display or highlight on the output device, based on the second input, the sub-image associated with the selected attribute. The processor can output to the output device a description including the relationship between the selected topic, the sub-image, and the selected attribute.

In certain embodiments of the present invention, each attribute corresponds or links in memory to a sub-image. In one aspect, the sub-image can be a visual representation of the attribute. In another aspect, the sub-image can be a representation of an item, object or thing that sounds like the attribute. In yet another aspect, the sub-image can be a visual representation of an item, object or thing that is associated with the attribute.

The sub-images can be displayed such that the images interact with one another. The sub-images can tell a story in pictures or form a narrative within the pictorial mnemonic. The sub-images can form a cohesive larger image or pictorial mnemonic. In another aspect, the sub-images are not directly related and simply are displayed within a larger image or pictorial mnemonic.

Figure 1:
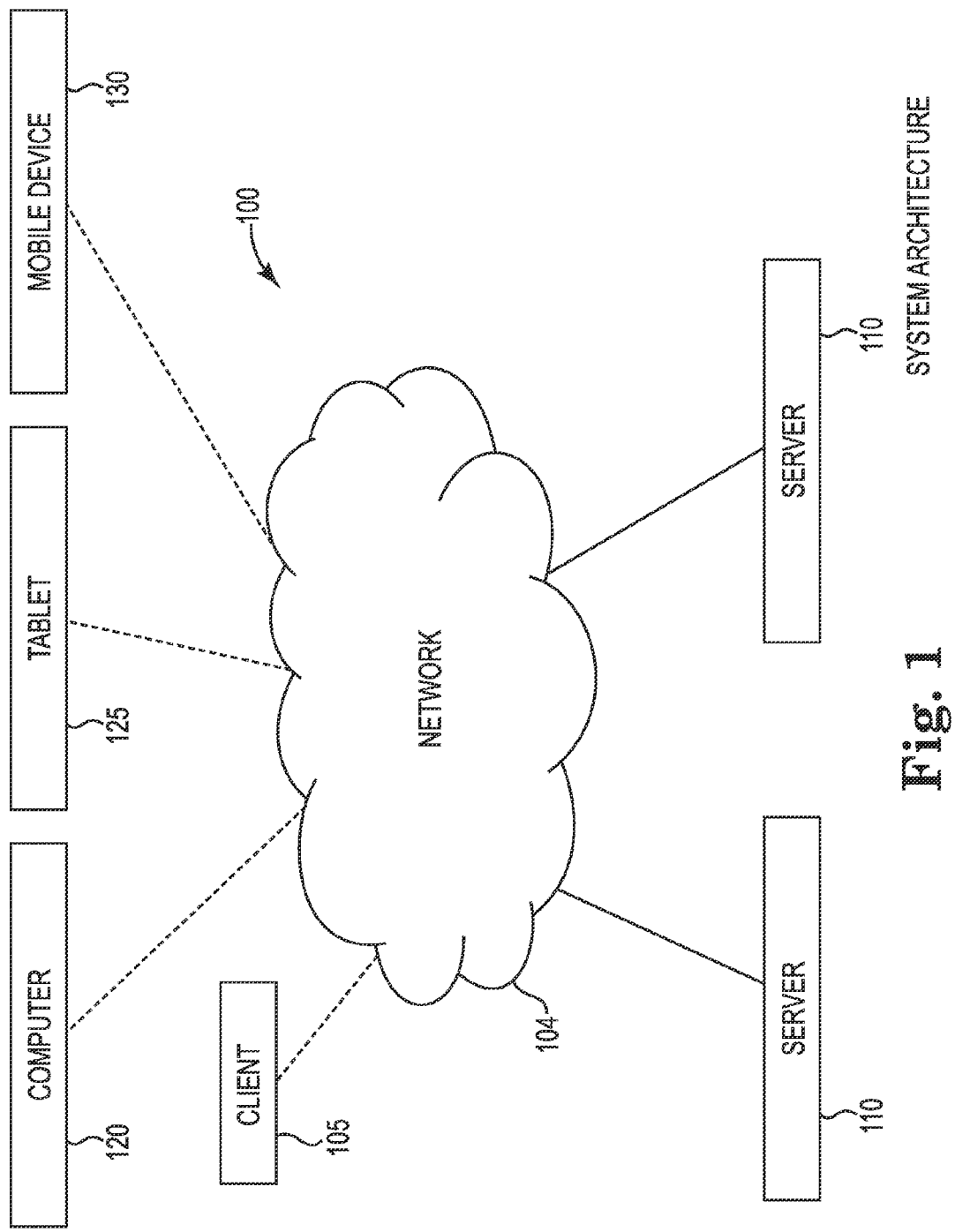
FIG. 1 is a diagram of exemplary architecture of a communication system, in accordance with exemplary embodiments of the present invention.

Referring now to FIG. 1, an exemplary architecture of a communication system in accordance with embodiments of the present invention is illustrated. System 100 includes at least one web server 110 that is configured to communicate with one or more client user devices 105 through a communications network 104 (e.g., the internet). Examples of client user devices include a computer 120 (e.g., laptop or desktop), a tablet 125 (e.g., an iPad), and a mobile device 130 (e.g., a smartphone). The system, method and computer program product of the present invention can, for example, be deployed as a client-server implementation, as an ASP model, or as a standalone application running on a user device 105. In certain embodiments the program or software is a "web app," such as an HTML5 app.

The client user device 105 can be configured to communicate with one or more web servers 110 via the network 104. Servers 110 are configured to generate, maintain, and host the computer program product in one embodiment. The servers 110 generate, maintain and host web pages (e.g., HTML documents) that embody the present invention. The servers 110 include services associated with rendering dynamic web pages, such as data storage services, security services, etc. Accordingly, servers 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Servers 110 may be coupled with a data storage facility, which may include one or more local or remote memory systems or units, and can include one or more databases and/or file systems for storing data, media, graphics, HTML documents, XML documents, etc.

Servers 110 can be configured to include an admin function, which enables an administrator to perform system-related functions. The system-related functions can include maintaining user records, performing upgrades on the software and topic content, and the moderation of tasks, quiz aggregation, comparative user performance, usage statistics, performance statistics, etc.

Figure 2:
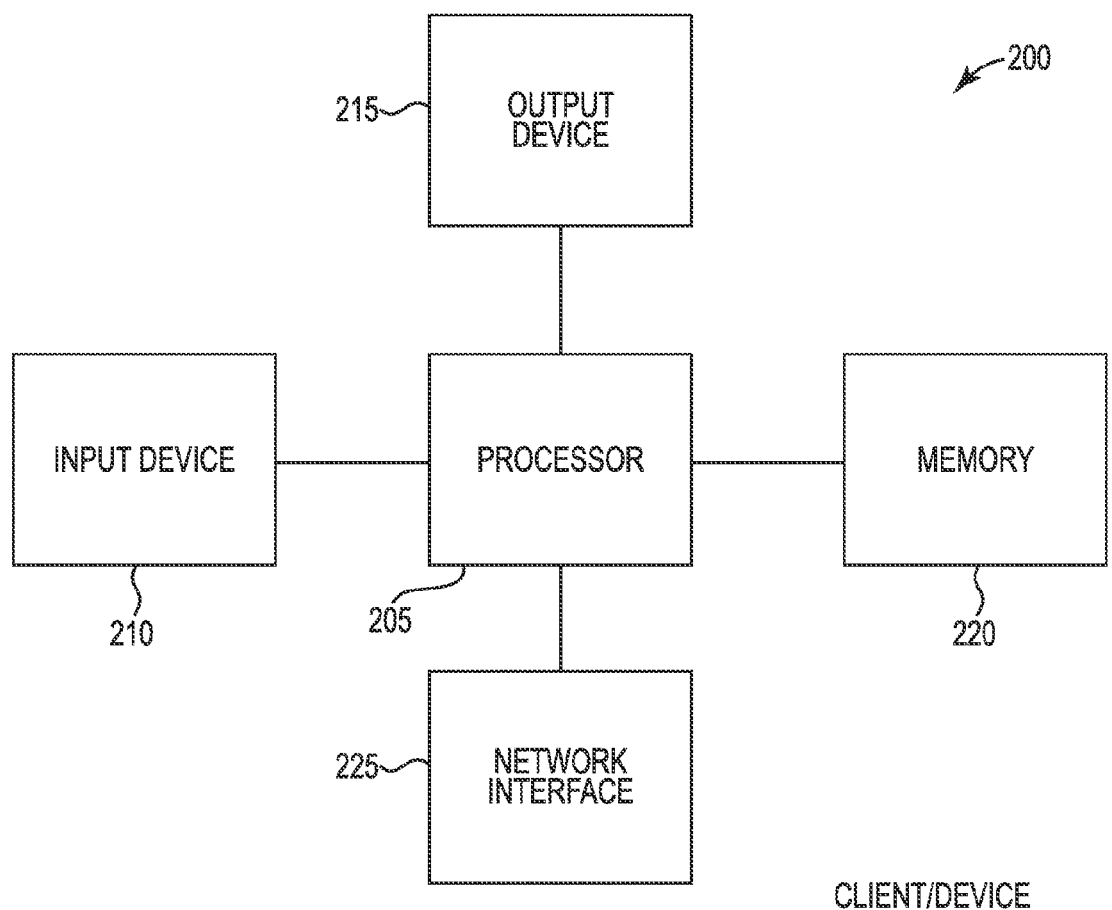
FIG. 2 is a block diagram of a client device, in accordance with exemplary embodiments of the present invention.

Referring to FIG. 2, a block diagram of a device 200, such as for example, client user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
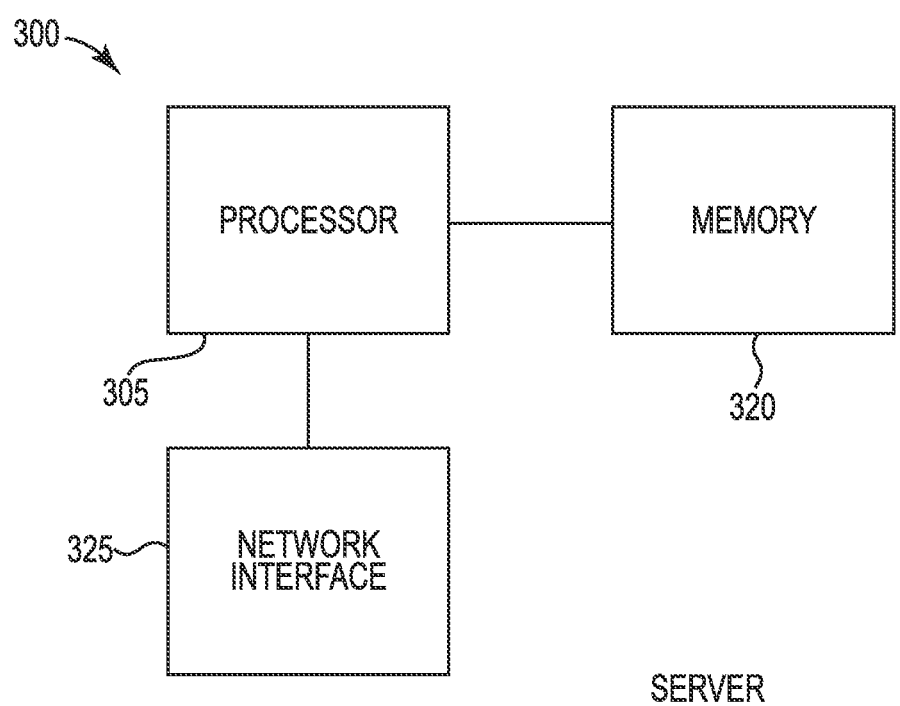
FIG. 3 is a block diagram of a server device, in accordance with exemplary embodiments of the present invention.

Referring now to FIG. 3, a block diagram of a server in accordance with exemplary embodiments of the present invention is illustrated. As shown in FIG. 3, the server 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305, which controls their operation and the flow of data and functionality between them. In various embodiments inputs can come from the device 200, to the server 300, via the network interface 315. Processing can occur at the server 300, at the device 200, or at both.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where server system 300 includes a microprocessor, computer readable program code may be stored in a computer readable medium, such as, but not limited to magnetic media (e.g., a hard disk), optical media (e.g., a DVD), memory devices (e.g., herein. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Server 300 can be configured to include an admin function, which enables an administrator to perform system related functions. The system-related functions can include maintaining user records, performing upgrades on the software and topic content, moderation of tasks, quiz aggregation, comparative user performance, usage statistics, performance statistics, etc.

In various embodiments, the computer program or application can include base selection options, including a "library" mode, a "learn" or study mode, a "store" mode, and a "game" or "quiz" mode. Each mode can be made available or displayed to the user at an initial landing or "dashboard" screen, or as a selection option while the user is active in one of the other mode screens. User selection of a particular mode displayed on a screen initiates software, algorithms and/or routines to operate the mode (e.g., on the server 300 or the client devices, via the network 104), including displaying content information to the user, and receiving and processing user input within that mode.

A dashboard or user profile screen and mode can be displayed that includes specific details on the user, feedback input options, summary learn and library information, as well as interactive links to promote learning and advantageous use of the software. For instance, in one embodiment a region of the dashboard mode or screen can include a summary of the confidence meter or values disclosed further herein, providing a chart (e.g., pie chart), table, text, or a graph representing the summary of each confidence level or value for that particular user. Users can then see a representation of how they are doing (e.g., number or percentage of cards that are mastered, to those where the use has a low level of competency). Selecting one of the confidence values (e.g., red or number 1, meaning a low level of comfort or competency) as a user input can cause the software to retrieve from memory all of the cards previously tagged or flagged with that confidence value by the user, and initiate the learn mode for those cards.

Each pictorial mnemonic has a set of attributes, each of which can contain details, including its hotspot coordinates within the pictorial mnemonic. Each pictorial mnemonic can be stored and presented or displayed as a "card," and a plurality of cards make up and are stored as a "stack." A stack can be a subcategory of multiple cards within a broader category. For instance, exemplary broad categories under medicine can include biochemistry, the cardiovascular system, the endocrine system, immunology, microbiology, the nervous system, pharmacology, the reproductive system, the renal system, etc. Each of these categories can include stack databases that delve even deeper into the category. For example, the biochemistry category can include stack databases on enzyme deficiencies, glycogen storage, vitamins, and the like. Further, exemplary cards within a stack, such as the vitamins stack, can include one or more cards directed to zinc deficiency, niacin, vitamin A toxicity, thiamine, riboflavin, etc. The cardiovascular system category can include stacks directed to the topics of heart disorders, heart murmurs, lipid lowering drugs, and the like. The heart disorders stack can comprise linked cards including bacterial endocarditis, dilated cardiomyopathy, rheumatic fever, etc. Again, a plurality of cards are stored in memory and linked to each of these stacks to organize and focus the subject matter or content from a broad category down to a single pictorial mnemonic or card. A myriad of categories can be included and stored within the software to assist users in learning and retaining subject matter in the areas of nursing, law, biology, junior/middle high school topics, high school topics, physics, engineering, history, and so on. Any topics or data where a student or user wishes or needs to learn and memorize characteristics, lists, attributes, or facts can be the subject matter of such a card and stack configuration implemented by the software. The examples provided are for illustrative purposes and are not intended to be limiting. Other category, stack and card content or topics can be implemented without deviating from the scope of the present invention.

As users engage with the application, they will have a chance to study predetermined sets of pictorial mnemonics or to create their own sets based on their own preferences and filters. Each study session will generally include a plurality of pictorial mnemonics or content topics and will be tracked for statistical data and as part of the user's overall history and/or profile.

The library mode presents the user with a database of selectable topics for studying in the learn mode (e.g., stacks and cards), as well as selections for additional topics and materials that can be purchased or otherwise obtained via the store mode. Again, stacks of cards are displayed for selection within broader categories.

The learn mode can be the primary mode in certain embodiments of the present invention, and provides the user with access to the various topics, images, sub-images, and attributes disclosed herein to assist the user in learning the material via the pictorial mnemonics provided.

The store mode is a selectable option for the user to purchase or otherwise add categories, stacks of cards, individual cards, or subscriptions to the user's library database.

The game mode allows users to test themselves on topics presented and learned in the learn mode, via a gamified quiz. The user can select particular topics for a quiz, or an have the computer generate the topics based on the selection of multiple topics, or via a random selection generator in communication with the user's library database.

Library Mode

Figure 4:
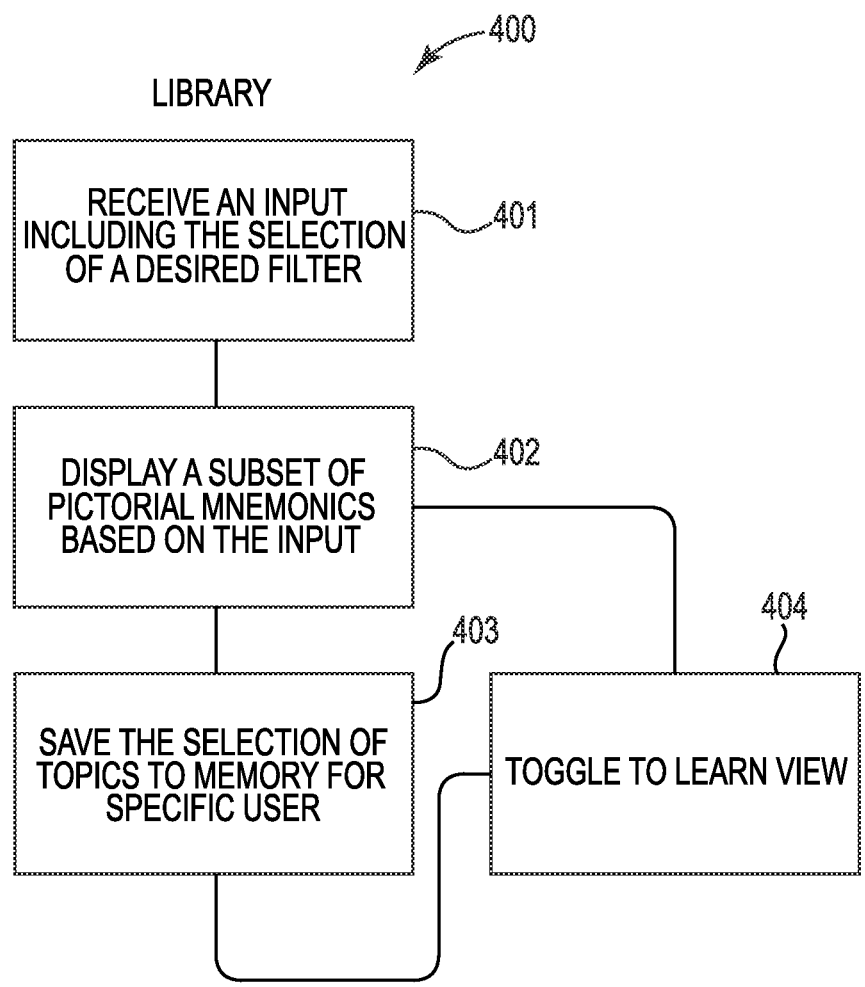
FIG. 4 is a flow diagram illustrating the steps of a "library mode," in accordance with exemplary embodiments of the present invention.

Referring to FIG. 4, a flow diagram illustrating the method and program steps of the "library mode" in accordance with exemplary embodiments of the present invention is provided. The method 400 includes receiving user input 401, including the selection of a desired filter. A user can select one or more categories to filter the various stacks and/or cards stored under that category, as described above and herein. Next, the software displays (e.g., via highlighting, checkmarks, isolated display, select indicia, etc.) a subset of pictorial mnemonics/topics based on the filter input (step 402), e.g., stacks and cards associated or linked to the stacks for the filtered category. In addition, the method 400 can include saving the selection of topics to memory in step 403. The user can then toggle to the learn mode at step 404 to initiate learning of the selected stacks or topic cards.

Figure 5:
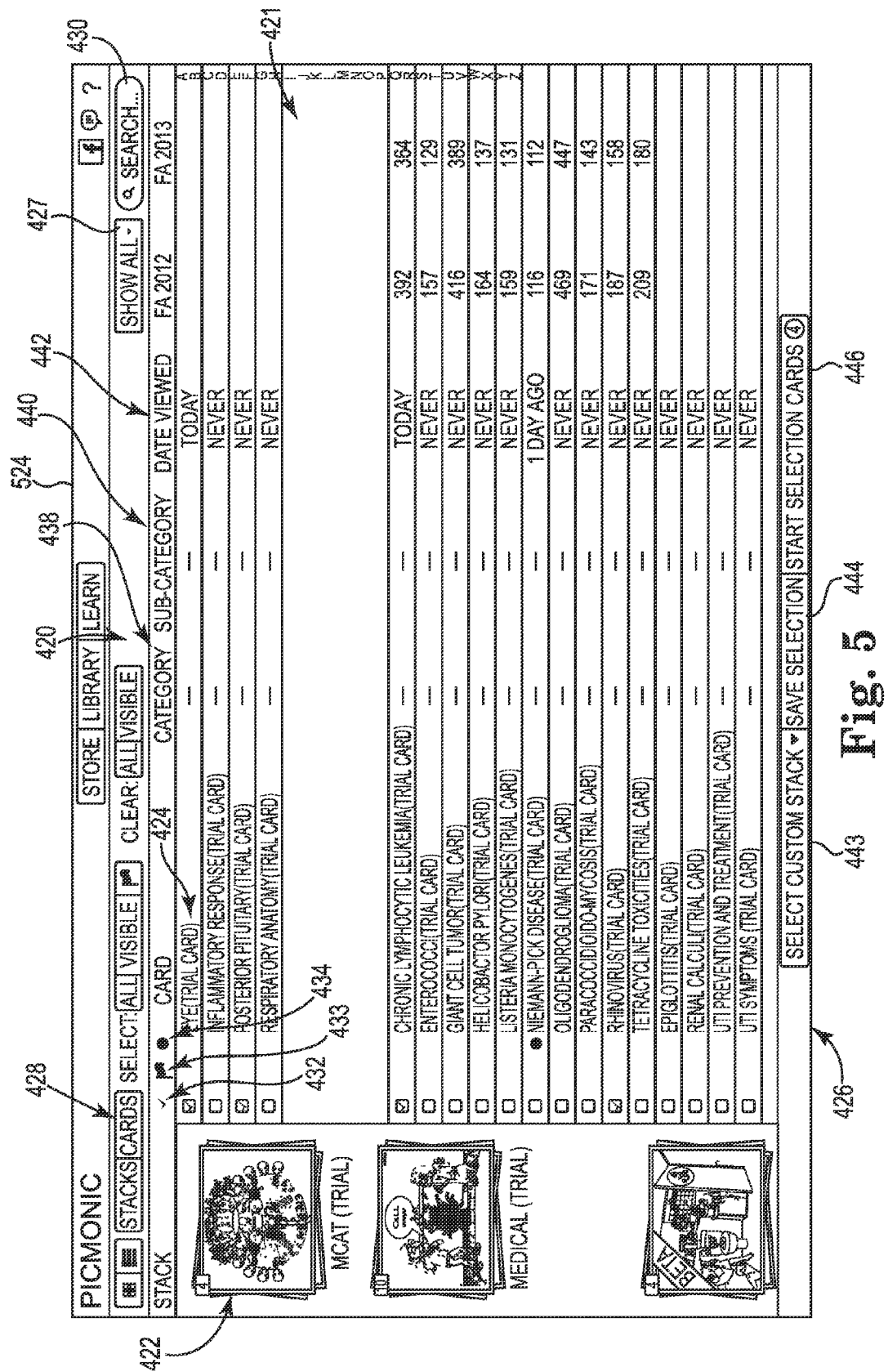
Figure 6:
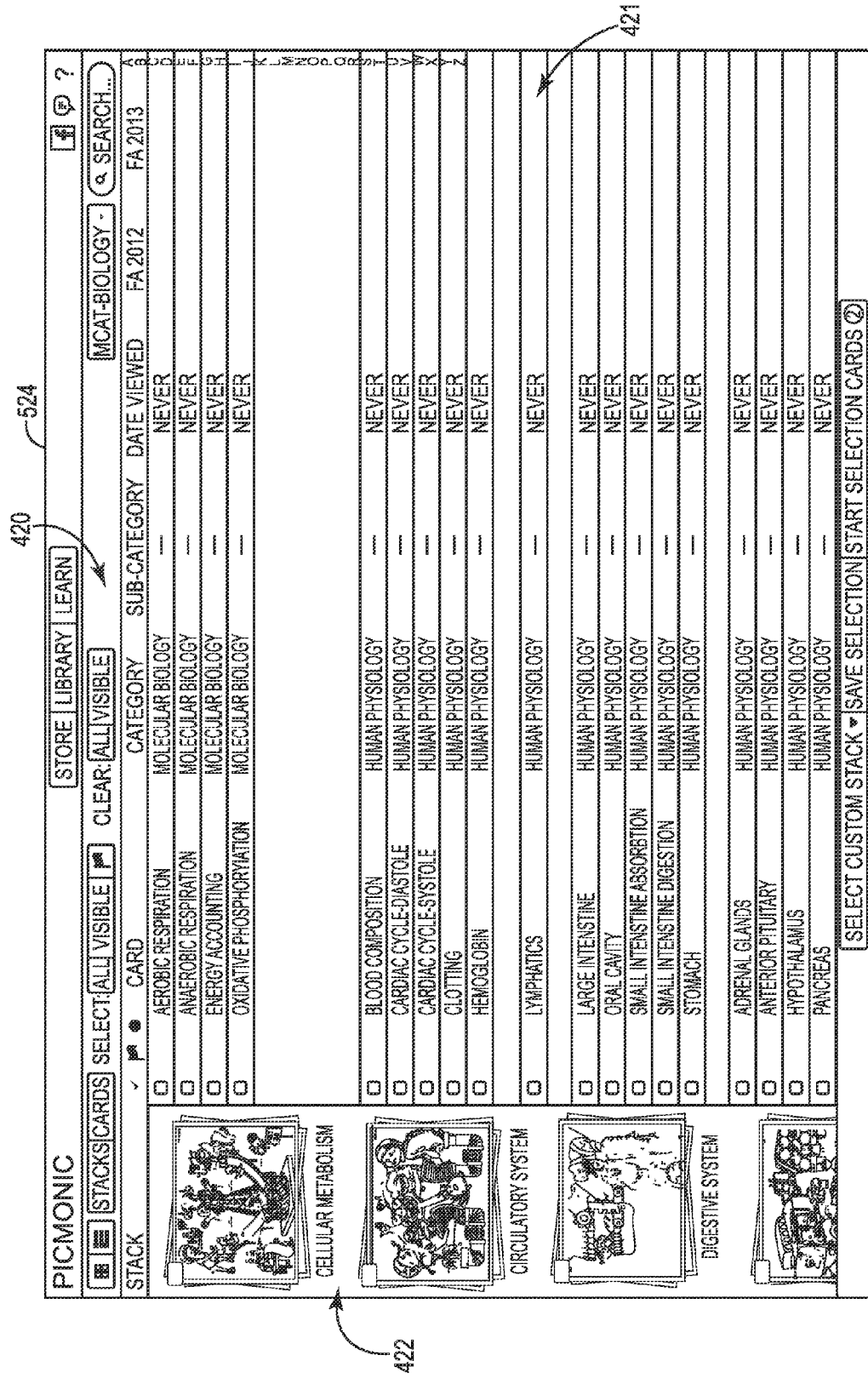
Figure 7:
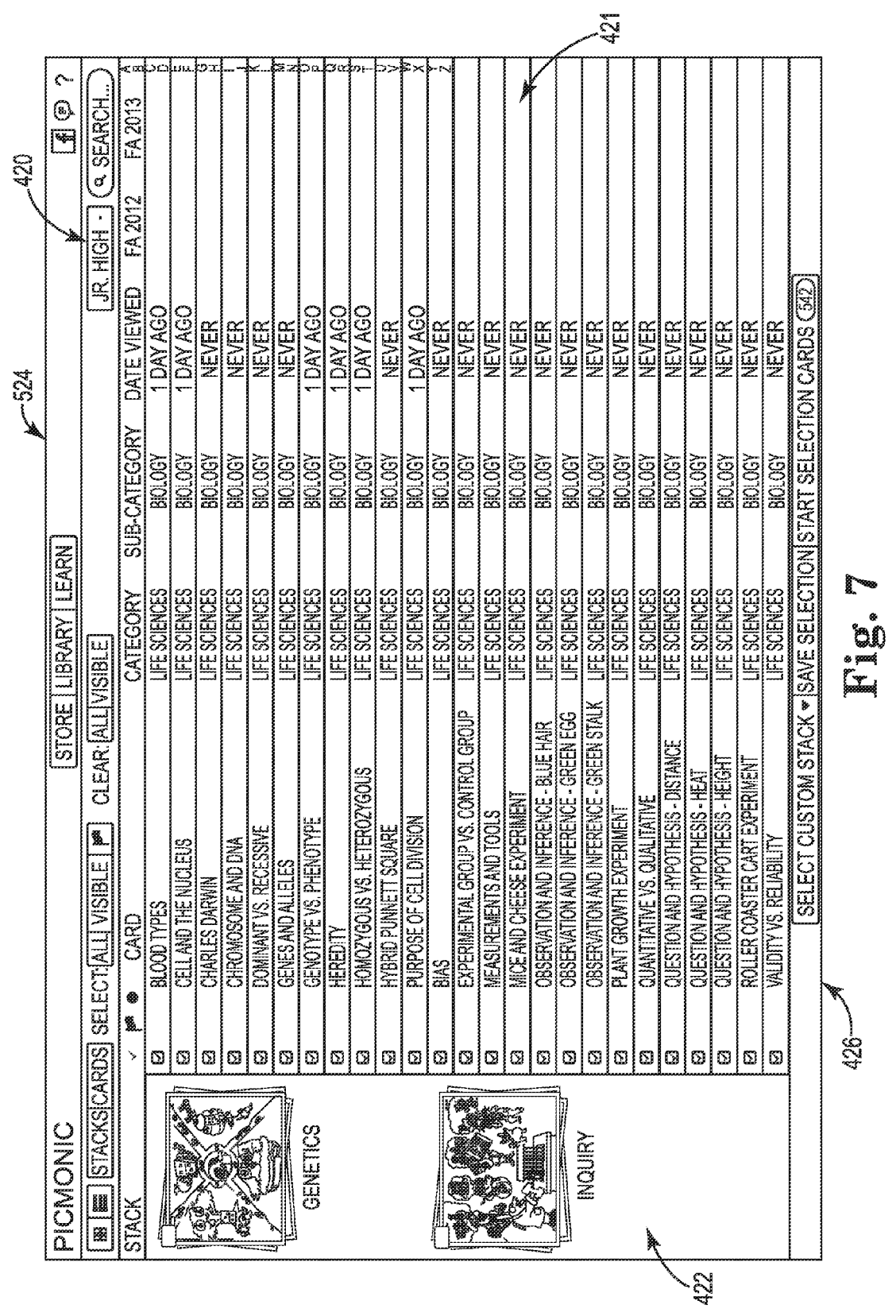

Referring to FIGS. 5-7, screen shots of the software are provided as exemplary illustrations of the "library mode" operation and software functionality in use. Various regions are provided and displayed in the library mode: a general selection region 420, an itemization region 421, a stack selection region 422, a card identifier region 424, and a summary selection region 426.

The general selection region 420 can include a plurality of viewing, selection and filtering options displayed and configured to receive input by the user. These options permit the user to easily and broadly select, as well as selectively view, stacks and cards for designating topics in the library database and storing those selections in memory such that they will be accessible for display and interaction in the learn mode. A broad category select 427 is displayed such that the user can select from various topic categories, including but not limited to MCAT content, medicine, nursing, law, biology, junior/middle high school topics, high school topics, physics, engineering, history, etc. User input can result in the display of a list, pull down menu, or graphical grid or tile of categories for selection. A stack and card select 428 is displayed and user input can toggle between a view that displays only cards, or card lists, in the itemization region 421, or a combination of card lists and stacks (e.g., via stack images or other indicia) in the region 421. A search field 430 is displayed and allows users to input terms, phrases, or keywords to search for in the library database of stacks and cards. The user can search for topics, attributes, and other related subject matter to find relevant cards within the library. The software will conduct a search based on the entered keywords in the search field and display and/or list the corresponding stacks and/or cards from the database in the region 421.

The itemization region 421 can further include a plurality of columns or other distinct display or card list sections, including a checkbox or card selection area 432, a confidence area 434, a category identifier area 438, a sub-category identifier area 440, and a view summary area 442. Each card can include an adjacent checkbox displayed in the checkbox area 432 such that the user can select that card and store it in memory for viewing and learning in the learn mode. A selection by a user of a stack image or other stack indicia in the stack selection region 422 can correspondingly group each of the cards linked to that stack. Individual cards within the stack group can be unselected via user selection of the adjacent checkbox. Other selection inputs and techniques known to those skilled in the art can be used with the present invention as well for area 432.

The region 424 or column can display a description or name for the card topic. The confidence area 434 can display the confidence value (and color) stored in memory based on the user's input during use of the learn mode, as disclosed in greater detail below. The category identifier area 438 displays the particular topic category for the card, and the sub-category identifier area 440 displays a particular topic sub-category or secondary category for the card. The view summary area 442 can provide and display a time stamp indicating the last time the card was viewed in learn mode.

The summary selection region 426 can display a summary of the various cards selected by the user, or automatically, in the library during operation in the library mode. The region 426 can display text, images and/or numeric indicia representing the number of cards stored in memory for display and use in learn mode. The user can input or select specific cards via area 432 in the library and select a save option 444 displayed. The selected or tagged cards are saved to memory with a user customizable name or identifier for retrieval and later display and use as a custom stack of cards. The user can then retrieve one or more custom stacks from memory by selecting the custom stack select option 443. This option allows users to create their own stacks for immediate or delayed use based on study needs, topic weaknesses, strengths, etc. The user selection of option 443 can display a list, icons or otherwise provide indicia for the user to pick and retrieve a custom stack for display and use in learn mode.

FIG. 6 depicts a library mode screen shot, wherein "MCAT" study stacks and card topics are listed and displayed. FIG. 7 depicts a library mode screen shot, wherein "junior high school" content stacks and card topics are listed and displayed. As disclosed herein, a myriad of topics and subject areas are envisioned for incorporation into the pictorial mnemonic systems, software and methods of the present invention.

Figure 5A:
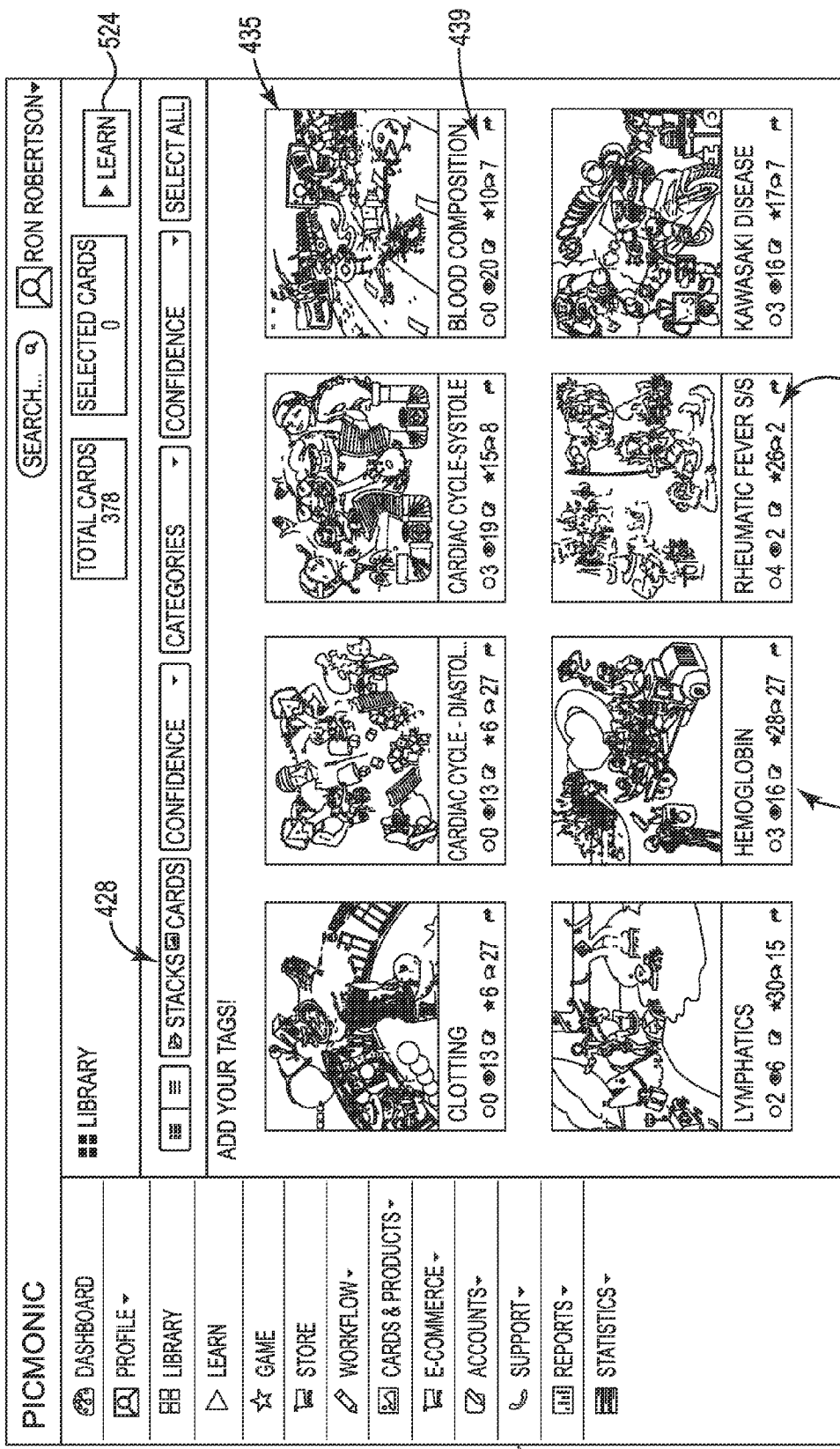

While various embodiments of the library mode are depicted in a combination image and list/column format, other embodiments can be displayed on the screen in an image-tile configuration, as shown in FIG. 5A. Each card can be represented by a graphic or tile 435. The displayed card and stack information disclosed herein, such as flags, confidence indicia, time since last viewed, relevant category, and the like, can be displayed and receive user input/selection as with the other embodiments of the library mode, except in a region 439 below the particular card tile 435, or elsewhere on the screen, displaying graphics, icons and/or text. Such embodiments can further include an access bar 437 displayed by the software proximate the card tiles 435, displaying user input options for the library mode, learn mode, game mode, store, card views, profile select, etc.

Learn Mode

Figure 8:
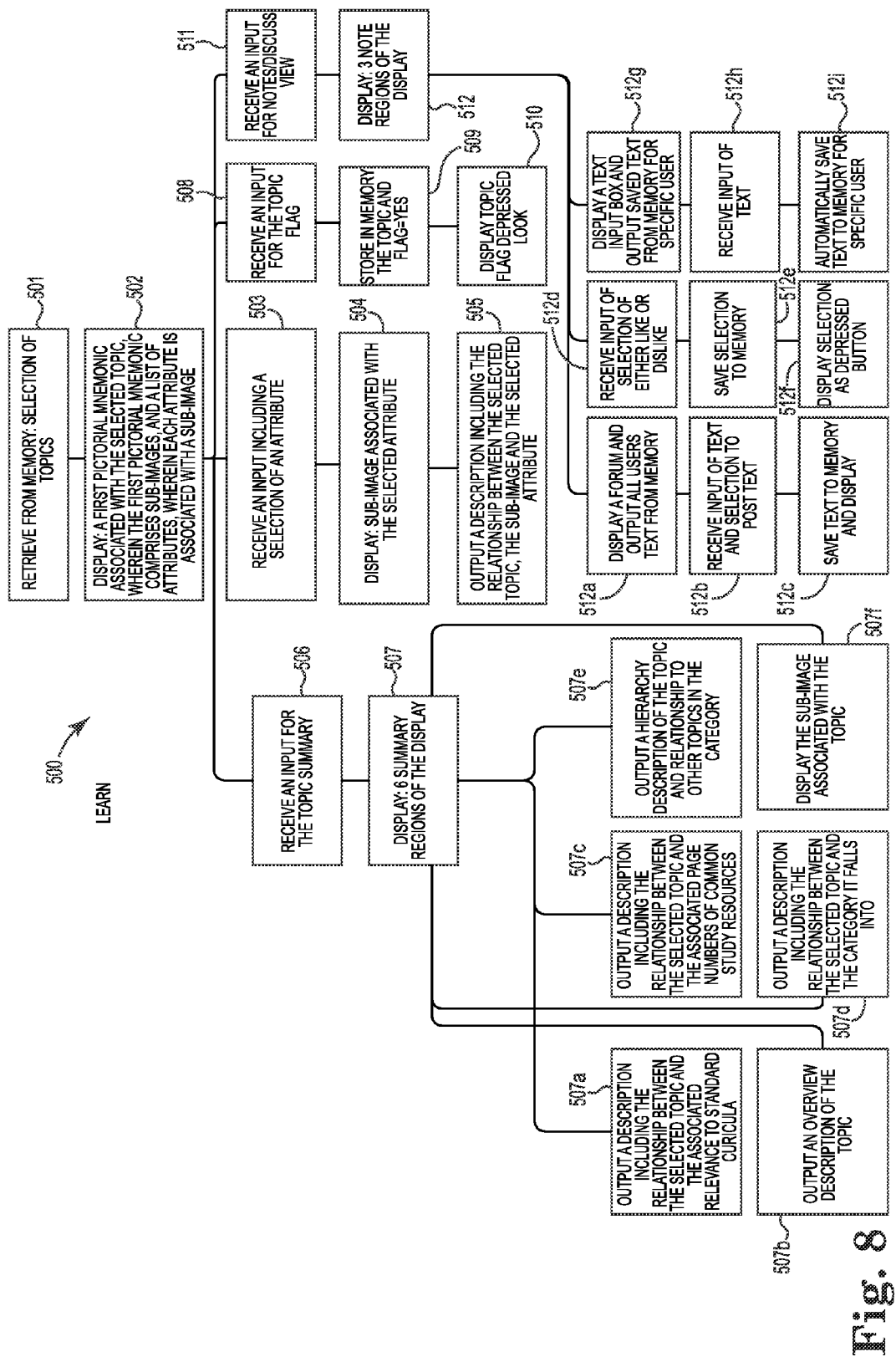
FIG. 8 is a flow diagram illustrating the steps of a "learn mode," in accordance with exemplary embodiments of the present invention.

Referring now to FIG. 8, a flow diagram illustrating the steps of the "learn mode" in accordance with exemplary embodiments of the present invention is provided. In an embodiment of the present invention, method 500 includes receiving from memory a topic or card selection, or topic selections (step 501), e.g., directly from the filtered input selections made by the user in the library mode. Alternatively, the user can select a topic or card from within the learn mode in certain embodiments.

Next, method 500 includes displaying at step 502 a first pictorial mnemonic associated with a selected topic, wherein the first pictorial mnemonic comprises one or more sub-images, and a list of one or more, or at least two, attributes, wherein each attribute is associated with a sub-image. The first pictorial mnemonic and the list of attributes can be displayed as two separate objects on an output device or display device/screen as described herein. Alternatively, the first pictorial mnemonic and list of attributes can be displayed as one object. In certain embodiments, the list of attributes can appear near an associated sub-image linked in memory.

In step 503, method 500 includes receiving a second input including a selection of one of the displayed attributes. The second input can be received from a user or from a software or hardware component. In certain embodiments of the present invention, a user can use an input device, such as a mouse to select or click, or simply pass over, a visual or textual representation of the attribute to facilitate selection. In certain embodiments of the present invention, an algorithm can provide (random or pre-defined) an input to select an attribute. Alternatively, an algorithm can methodically provide an input in a desired order.

Next, method 500 includes displaying, based on the second input step 503, the sub-image associated with the selected attribute of step 504. In certain embodiments of the present invention, the sub-image is "zoomed" in on, enlarged or otherwise highlighted to focus on the particular sub-image associated with the corresponding attribute. Alternatively, the sub-image can be highlighted or emphasized in a similar manner. By displaying the sub-image, the user can learn to associate a specific attribute with a specific sub-image.

In step 505, method 500 includes outputting or displaying a description including the relationship between the selected topic, the corresponding or linked sub-image and the selected attribute. Examples of descriptions output include displaying text on a display device or output, displaying a video on the display device, or playing audio on an audio device or output. In certain embodiments of the present invention, the description provides information on the relationship between the topic, the sub-image and the attributes. The description can additionally or alternatively provide information on the relationship between the pictorial mnemonic, the topic, the sub-images and the attributes.

In addition to the steps of method 500 described above and directed to the inputs and outputs relating to the topic, attribute, and sub-image of a pictorial mnemonic, other steps can be included to enable additional inputs and outputs. Step 506 can include receiving user input to select a summary of the topic. In response to the user selection of the topic summary, textual, graphical and/or audio information is displayed or outputted (e.g., in a designated region on the screen) in step 507. Steps 507a-507f provide exemplary information or data that can be outputted, including a description of the relationship between the selected topic and the associated relevance to standard curricula (step 507a), an overview description of the topic (step 507b), a description of the relationship between the selected topic and the associated page number of common study resources or references (step 507c), a description of the relationship between the selected topic and the broader category it falls into (step 507d), a hierarchal description of the topic and its relationship to the other topics in the category (step 507e), and a display of the sub-image (e.g., displayed smaller) associated with the topic (step 507f).

In addition to topic summary information, the method 500 can include a step 508 to receive user input selection of a "topic flag" option. When a user selects a visual flag option 531 for a particular card, the software stores a corresponding flag to memory so that such cards can be sorted by, and are displayed in the library with a flag or like indicia. The user can use this information to go back and work on cards of particular interest, those that require additional focus or learning time, or that are of relevance or import. This input selection can cause the software to store in memory that the topic flag was selected (e.g., flag=yes) at step 509, and display the selected topic flag 531 with a highlighted (e.g., engaged or depressed button) visual depiction, or any other representation to highlight or emphasize its selection, at step 510.

Step 511 of the method 500 is configured to receive an input from a user that a "notes" and/or "discuss" option has been selected. Upon user selection at step 511, a notes region is displayed for further input at step 512. Steps 512a-512i provide exemplary input and output/display options for the selected notes and/or user discussion region. In certain embodiments, three regions can be displayed, wherein steps 512a-512c are associated with a first note region, steps 512d-512f are associated with a second note region, and steps 512g-512i are associated with a third note region. The first note region can include displaying a user forum region to output, from memory, text for one or all users (step 512a), receiving input of text and/or a selection by the user to post or publish inputted text (step 512b), and saving the inputted text to memory and displaying the inputted text (step 512c). The second note region can include receiving user input of a selection of "like" or "dislike" representation (step 512d), saving the inputted selection from step 512d to memory (step 512e), and displaying the selection "like" or "dislike" as a depressed visual depiction (step 512f). The third note region can include displaying a text input box or option for private user notes (step 512g), receiving user text input (step 512h), and saving the inputted text to memory for the specific user providing the input (step 512i).

Figure 8A:
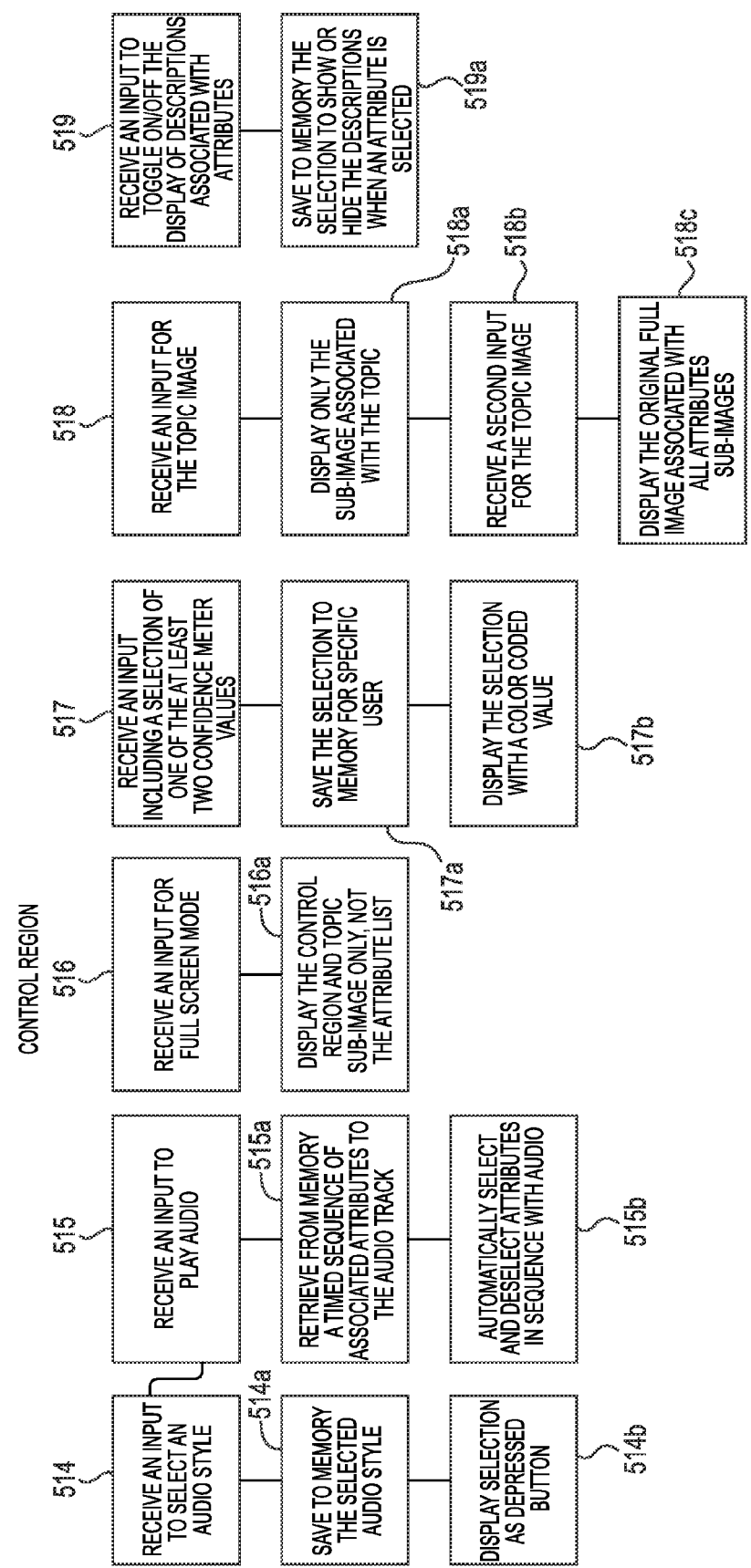
FIG. 8A is a flow diagram illustrating the steps of a control region in a "learn mode," in accordance with exemplary embodiments of the present invention.
Figure 9:
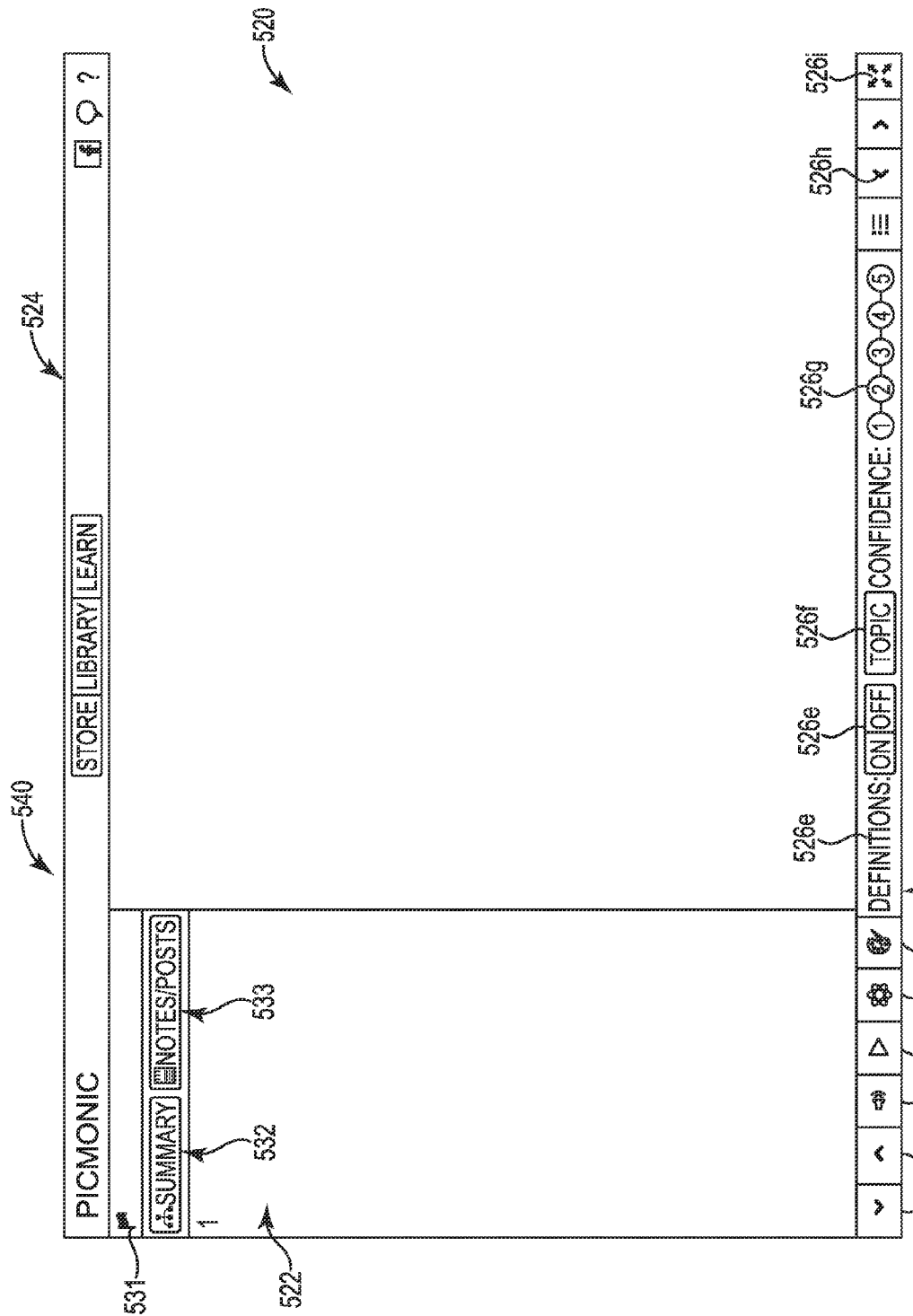
FIG. 9 is an image of a base learn mode screen, in accordance with exemplary embodiments of the present invention.

Referring now to FIG. 8A, a flow diagram illustrating the steps of the control region of the learn mode is provided. In an embodiment of the present invention, control region steps can include receiving an input to select an audio style associated with an audio output file for the topic (step 514), saving to memory the selected audio style (step 514a), and displaying a representation that the audio style is selected (step 514b) (e.g., depressed button depiction). Further, user input can be received to play the audio (step 515), wherein the software retrieves from memory a timed sequence of attributes associated with the audio track/file (step 515a), initiates output playing the audio track/file, and automatically selects or highlights on the display, and deselects or un-highlights on the display, the attributes in sequence with the audio track/file (step 515b).

At step 516, the control region method includes receiving an input from the user for "full screen" mode, and displaying the control region and topic sub-images only, such that the attribute list is not displayed (step 516a).

At step 517, the control region method includes receiving an input selection of one of a plurality of confidence meter values, saving the selection to memory for the user providing the input (step 517a), and displaying the selected confidence meter value (step 517b). For instance, each value on the meter can be assigned a different color, or other indicia, such that selection of a numeric value (e.g., values 1 to 5) on the meter corresponds with its own color or indicia. The highest number on the meter (e.g., value 5) can represent a high level of comfort or competency such that selection of that value is associated with the color green. A low level of comfort or competency (e.g., value 1) can be associated with the color red. Users can change the selected value as the level of comfort changes during use and learning, and that value and linked color code can be stored in memory for later display and/or use by the software. The data stored based on this confidence input from the user is displayed and summarized, and is further selectable, in each user's profile or dashboard screen, as detailed herein. Other progress, feedback and/or competency metering techniques and processes can be employed as well without deviating from the scope of the present invention.

At step 518, the control region method can include receiving an input selecting the "topic" image, displaying only the sub-image associated with the topic (step 518a) (e.g., removing or hiding from display the sub-images associated with the attributes), receiving a second input selecting the "topic" image (step 518b) and displaying the complete pictorial mnemonic including the sub-image associated with the topic and each of the sub-images associated with the corresponding attributes.

At step 519, the control region method can include receiving an input to toggle on and off displaying of the description associated with displayed attributes, and saving to memory the selection to display or hide the descriptions when an attribute is selected (step 519a).

Referring to FIGS. 9-15, screen shots of the software are provided as exemplary illustrations of the "learn mode" operation and software functionality in use. Various regions are provided and displayed in learn mode: an image region 520, an attribute or hotspot region 522, a mode option region 524 and a control region 526. The mode option region 524 displays the operational or functional modes for the software, e.g., "store," "library" and "learn" and permits users to toggle back to a different mode at any time. Again, other modes of operation (e.g., game or quiz modes) can be provided in other embodiments of the present invention without deviating from the scope of the present invention. The pictorial mnemonic 521, attribute 523 list and other data can be stored and displayed in any number of ways as would be understood by one of ordinary skill in the art.

The image region 520 is configured to display the pictorial mnemonic 521 and corresponding sub-images 525, including the topic image (e.g., pick in a man's knee, for Neimann-Pick disease). The attribute region 522 is configured to display one or more of the key facts or textual attributes 530 corresponding with the pictorial mnemonic 521. One or more such key facts or attributes 530 can be displayed in the attribute region 522 and each generally corresponds to a respective sub-image 525 within the pictorial mnemonic of the image region 520.

The image region 520 and the attribute region 522 combine to define the content or learning "card" 540 that can resemble a virtual flashcard. In use, each card 540 can include a visual representation of the content topic, and an interactive demonstration that can include audio and/or video output to assist the user in learning the content. The interactive demonstration can begin automatically via software initiation (retrieved from memory) once the user clicks on or selects a particular card 540, or can begin upon an independent input selection by the user, as described herein. Further, multiple cards can be selected from the library database via user input (e.g., checkbox selection) such that a plurality of cards are queued in memory for selective or sequential display (e.g., sequential, user selected, generated randomly, etc.) in the learn mode.

The attribute region 522 can include various sub-regions displayed by the software. For instance, a summary select 532 region and a notes select 533 region can be displayed proximate the attribute items 530, or elsewhere on the displayed card 540. These selects 532 can be selected by user input. Once the user selects the summary select 532, a new summary page 534 of detailed information on the content topic is displayed. The summary page 534 can be displayed in the image region 520 (FIG. 15), on a separate page or card, in a separate pop-up window, or using other various techniques and processes. The summary page 534 can include and display a detailed textual summary of the topic, a list of relevant study references, relevant curricula, graphics, images, a smaller display of all of the sub-images, audio file links, video file links, like topic categories, etc. The notes select 533 region provides exemplary input and output/display options for user notes relating to individual stacks or cards, public and private, as disclosed in greater detail herein.

The exemplary pictorial mnemonic card 540 of FIG. 10 provides the following list of attributes 530 for the topic, "Niemann-Pick disease:"

1. Increase prevalence in Jewish populations
2. Sphingomyelinase
3. Cherry red macula
4. Hepatosplenomegaly
5. Neurodegeneration
6. Foam cells In this example, the attributes 530 are symptoms that are related to the medical card topic 540, Niemann-Pick disease. Each of the attributes 530 or symptoms is visually represented with a sub-image 525 in the pictorial mnemonic 521 for the disease. For instance, the "cherry red macula" attribute 530 can correspond with a sub-image 525 of a pair of cherries in a man's eyes, the "foam cells" attribute 530 can correspond to a sub-image 525 of foam coming from the man's mouth, and the "sphingomyelinase" attribute 530 can correspond to a sub-image 525 of a sphinx on the man's leg, to promote memory retention and learning.

Figure 11:
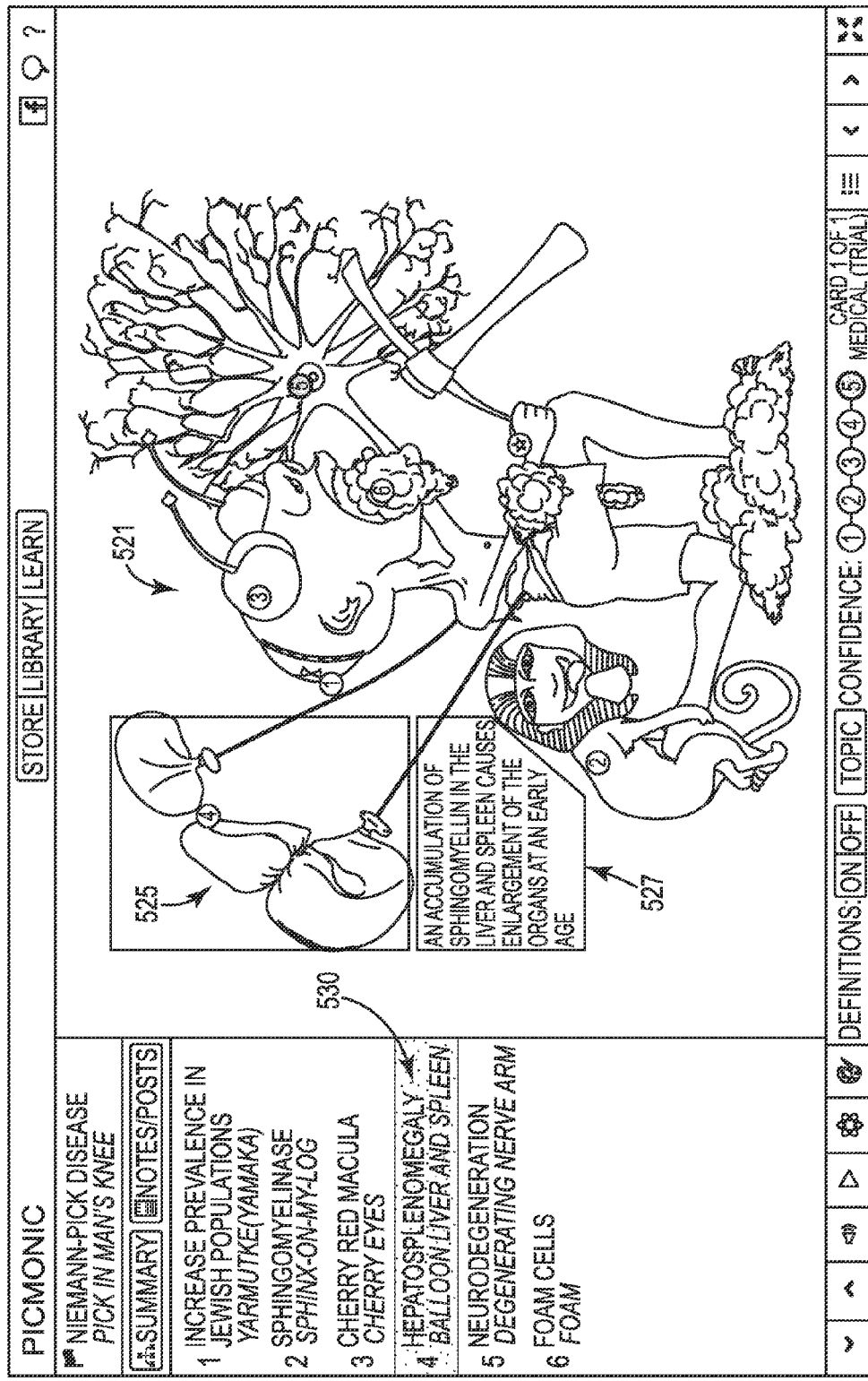
FIG. 11 is an image of a learn mode screen in use, with a sub-image and attribute highlighted, in accordance with exemplary embodiments of the present invention.

In various embodiments, as demonstrated in FIG. 11, user input (e.g., clicking or selecting a single attribute 530) can result in highlight displaying of the corresponding sub-image 525 for that attribute 530 such that it visually stands out from the remaining sub-images. Alternatively, the other non-selected attributes/sub-images can be temporarily removed from the displayed image region 520. Further, additional textual data 527, such as summaries, definitions and/or extended explanations, can be displayed adjacent or proximate the highlighted sub-image. The data 527 can include additional details on the selected sub-image 525 to further assist the user in learning the topic content, or particular attribute, to promote memory retention. Various methods, techniques and programmable display steps can be implemented to highlight or otherwise emphasize a selected attribute 530 and correspondingly linked sub-image 525.

The control region 526 provides a plurality of user-selectable options on the display screen which can be adapted to control or otherwise selectively display or highlight, and thereby review, the card content. For instance, in various embodiments of the present invention, the control region 526 can include an incremental select 526a, a sound select 526b, a play/pause select 526c, an audio select 526d, a definitions select 526e, a topic select 526f, a status/confidence select 526g, and a card selection input 526h. Each of these selectable inputs can be displayed on the screen in the learn mode using icons, text or like indicia and, again, are selectable by the user using an input mouse, a touch interface input, audio input, a keystroke, etc.

The incremental select 526a can include arrows, such that selection by the user sequentially progresses through (e.g., up or down, forward or backward) and displayingly highlights at least one of the attributes 530 and a corresponding sub-image 525 linked to that attribute 530 in memory. The sound select 526b provides sound control, such as a virtual slider or dial, for increasing or deceasing the volume of the audio output initiated during the learn mode. The play/pause select 526c is adapted to initiate (e.g., from the beginning of the audio or at the last point of pause) the playing of a media file or track, such as a video or an audio file, stored in memory. In certain embodiments, the media file is an audio file that outputs a summary of the card topic, and details of each of the attributes 530 and correspondingly linked sub-images 525. As the audio output progresses, the attributes 530 and/or sub-images 525 being referenced in the audio at a given time can be highlighted or otherwise emphasized by the computer on the display to stand out on the display screen relative to the other remaining attributes 530 and sub-images 525.

The audio input 526d can provide a user-selectable option to choose the type of audio to be outputted. For instance, a "classic" audio icon or indicia can be selected by the user to output a more traditional or academic explanation of the attributes 530 and sub-images 525 of the card 540—wherein the audio is more directed to the topic subject and facts than the creative mnemonic images. A "creative" audio icon or indicia can be selected by the user to output a creative audio explanation of the card topic, explaining via a creative story line of the sub-images 525 of the pictorial mnemonic—wherein the audio is more directed to the sub-mages than the attributes. The audio input 526d selection by the user dictates which version of the audio output is played from computer memory when the play/pause input 526c is selected.

Figure 13:
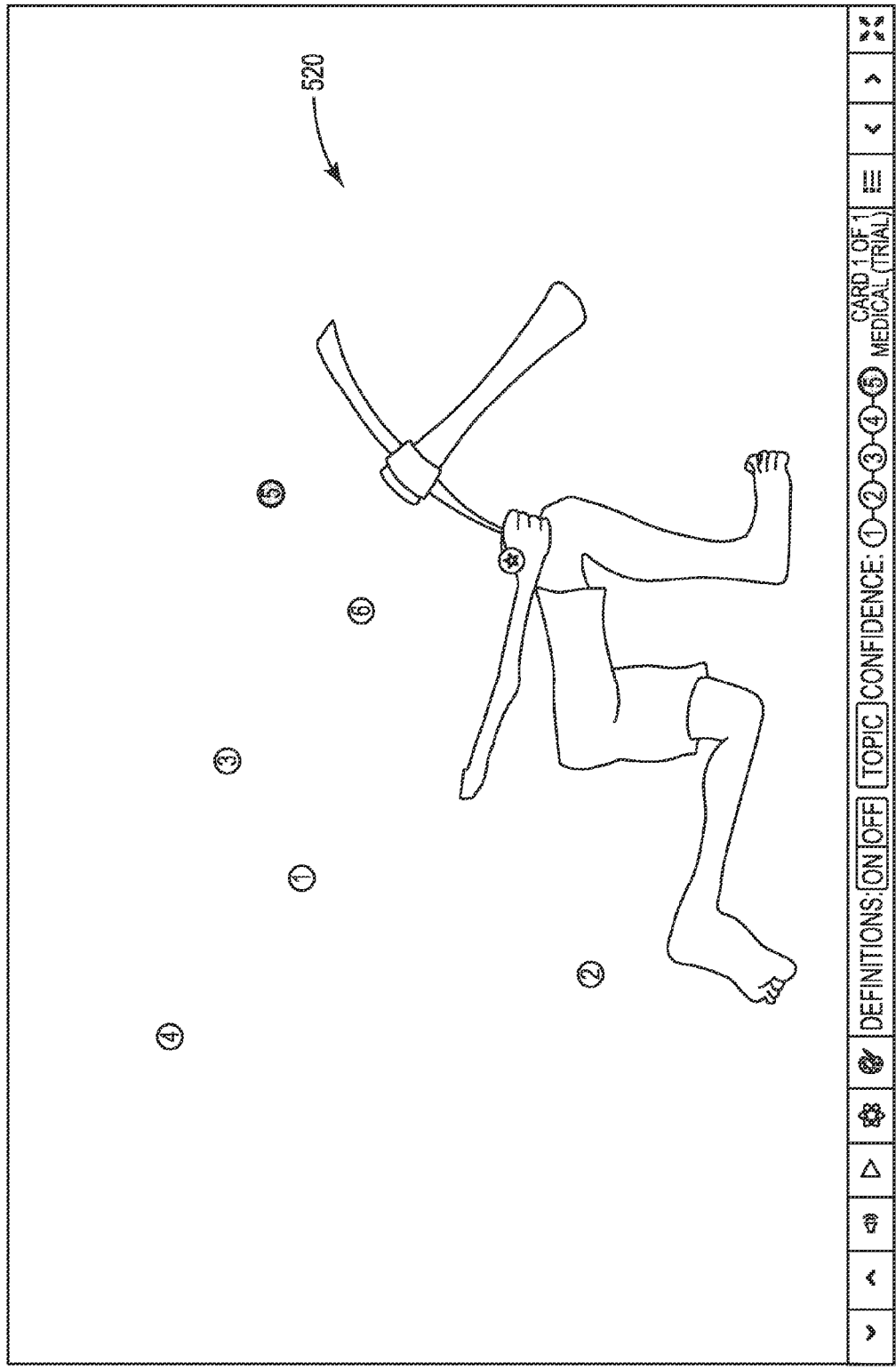
FIG. 13 is a full screen image of a learn mode screen in use, with the content topic displayed and the sub-images hidden to facilitate studying by a user, in accordance with exemplary embodiments of the present invention.

The topic select 526f provides users an input option to display only the sub-image associated with the broader topic, e.g., by removing or hiding from display the sub-images associated with the individual attributes, as shown in FIG. 13. Receiving a second input of the "topic" select can display the complete pictorial mnemonic including the sub-image associated with the topic and each of the sub-images associated with the corresponding attributes. This topic select feature permits users to hide or toggle on/off sub-images to facilitate studying and, thereby, providing a focused test or challenge scenario in the learn mode.

The status/confidence select 526g displays a plurality of confidence meter values or indicia. In certain embodiments, each value on the meter can be assigned a different color such that selection of a numeric value (e.g., values 1 to 5) on the meter corresponds with its own color. The highest number on the meter (e.g., value 5) can represent a high level of comfort or competency with the topic and attributes such that selection of that value is associated with the color green. A low level of comfort or competency (e.g., value 1) can be associated with the color red. Users can change the selected value as the level of comfort changes during use of the learn mode, and that value and linked color code can be stored in memory for later display or use by the software in other modes or with other features to widely track, store, process and display progress.

The card selection input 526h displays input options for the user to select or sequentially run through the cards stored in memory for the particular learn mode session. In certain embodiments user input displays a list of available cards. In other embodiments arrows or like indicia are displayed and user input sequentially progresses through the cards, forward or backward.

Figure 12:
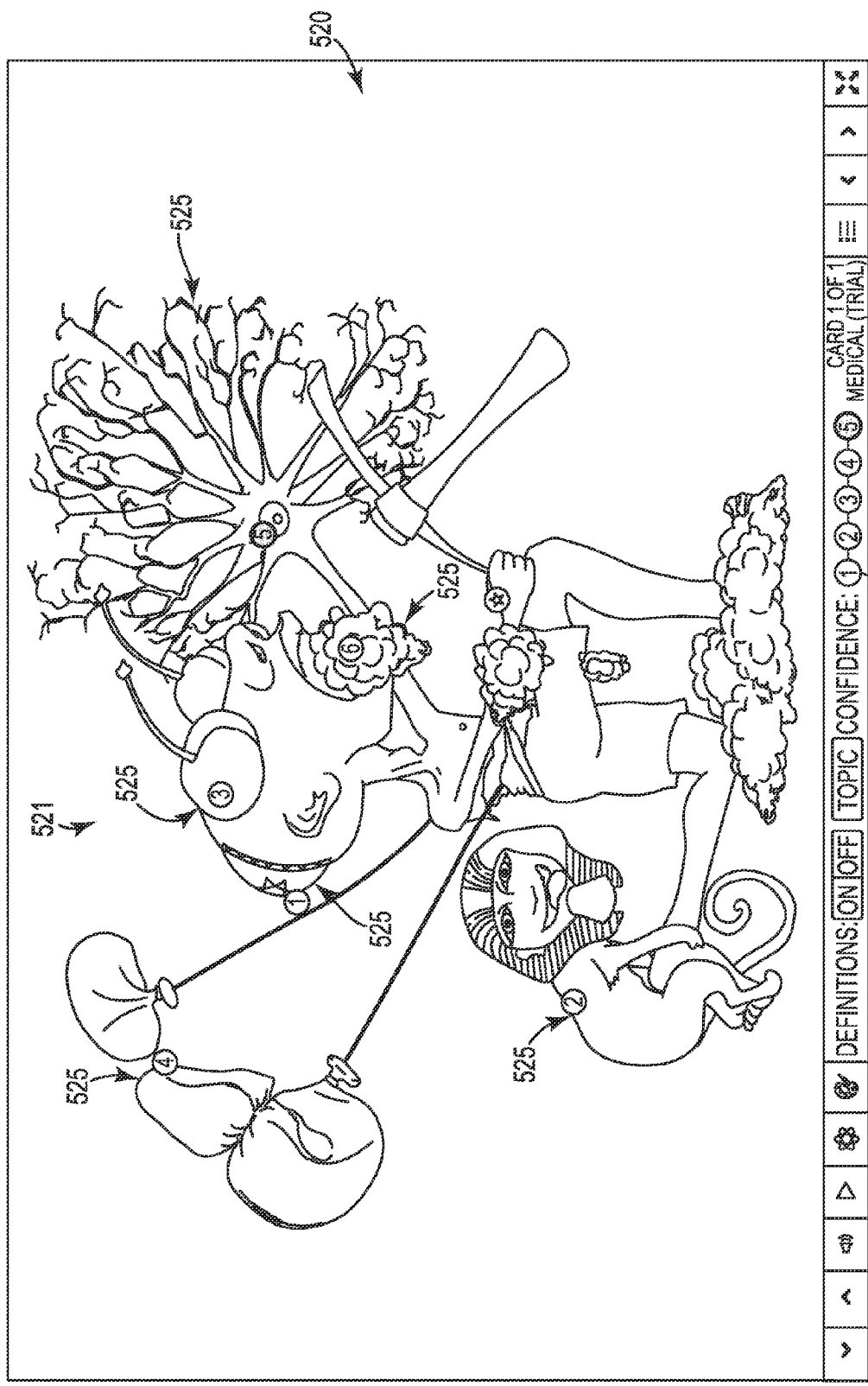
FIG. 12 is a full screen image of a learn mode screen in use, in accordance with exemplary embodiments of the present invention.
Figure 14:
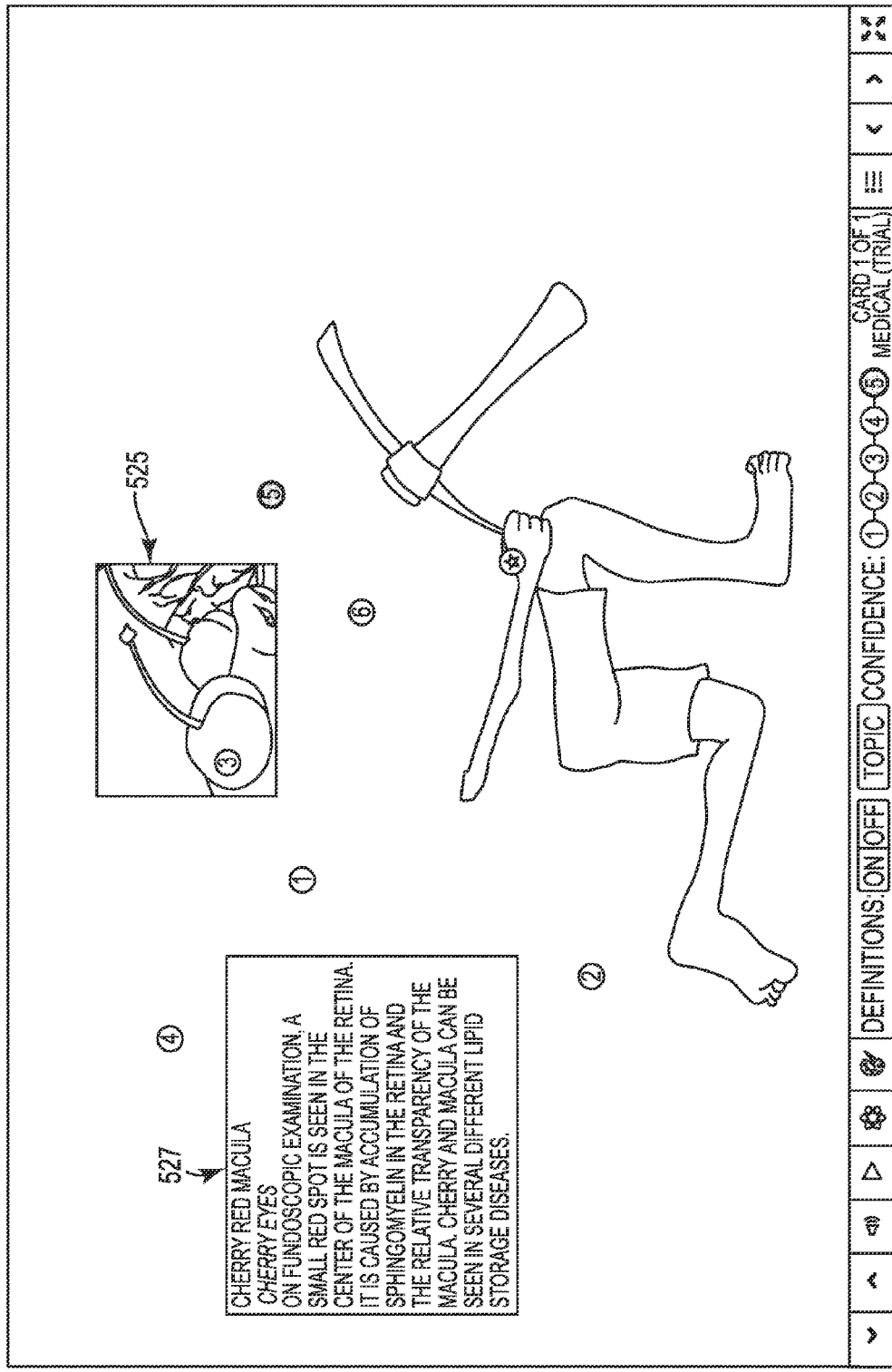
FIG. 14 is a full screen image of a learn mode screen in use, with the content topic and a single sub-image displayed, in accordance with exemplary embodiments of the present invention.

A screen selection input 526i is displayed such that user input displays only the control region and the topic sub-images (e.g., in a larger image region 520), such that the attribute list is generally not displayed, as shown in FIG. 12. This method of material presentation further assists studying efforts. FIG. 14 shows an exemplary embodiment of the present invention, with the learn mode displayed full screen (input 526i selected), and one of the sub-images selected (cherry red macula). Further, the definitions select 526e is toggled on via user input to display additional details and information regarding the sub-image and/or corresponding attribute.

Game/Quiz Mode

Referring generally to FIGS. 16-19, users can use and engage with the software in preparation for exams, or simply to determine subject and topic retention in a game mode method 600. The users will be able to reinforce the complex concepts and images they are absorbing through this interactive game or quiz. Topic attributes can drive the game play, with users selecting all of the cards in a selection containing a displayed attribute. The game will test speed of recall and overall memory, while storing and processing clear connections between concepts. The game reflects diagnostic practices common in medicine, and other fields. The game scenario aspect of the software can permit multiple players to compete against one another, or assist one another cooperatively.

Figure 16:
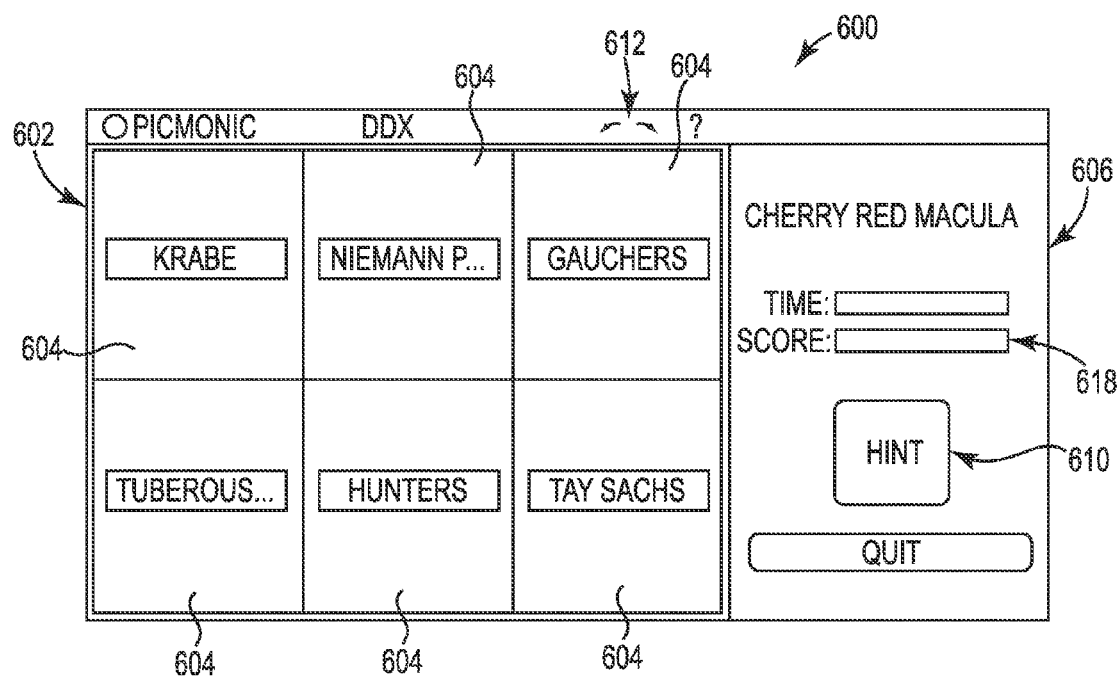
FIGS. 16-19 are images of a game or quiz mode in use, in accordance with exemplary embodiments of the present invention.
Figure 17:
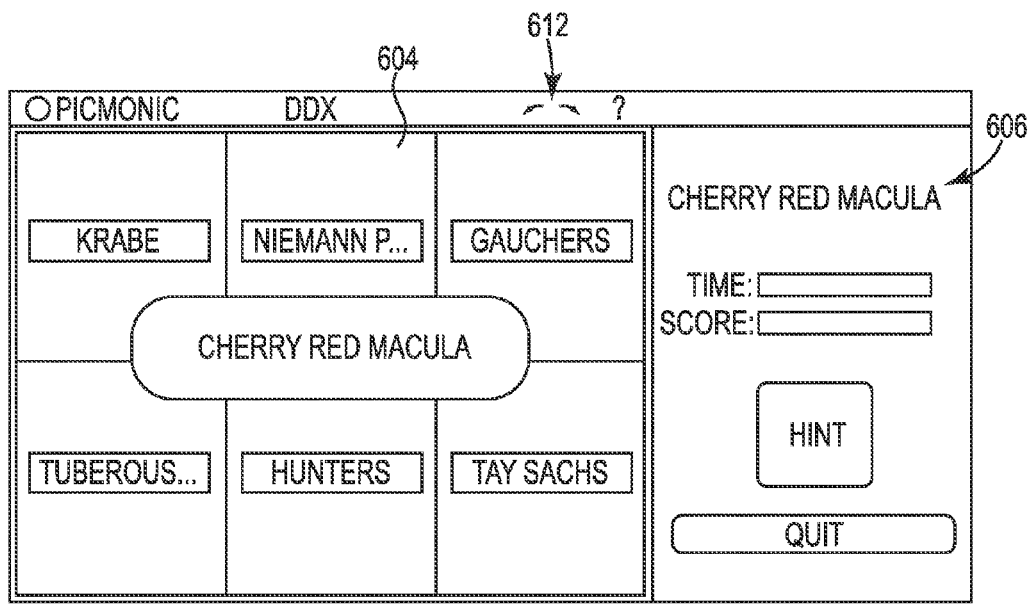
Figure 18:
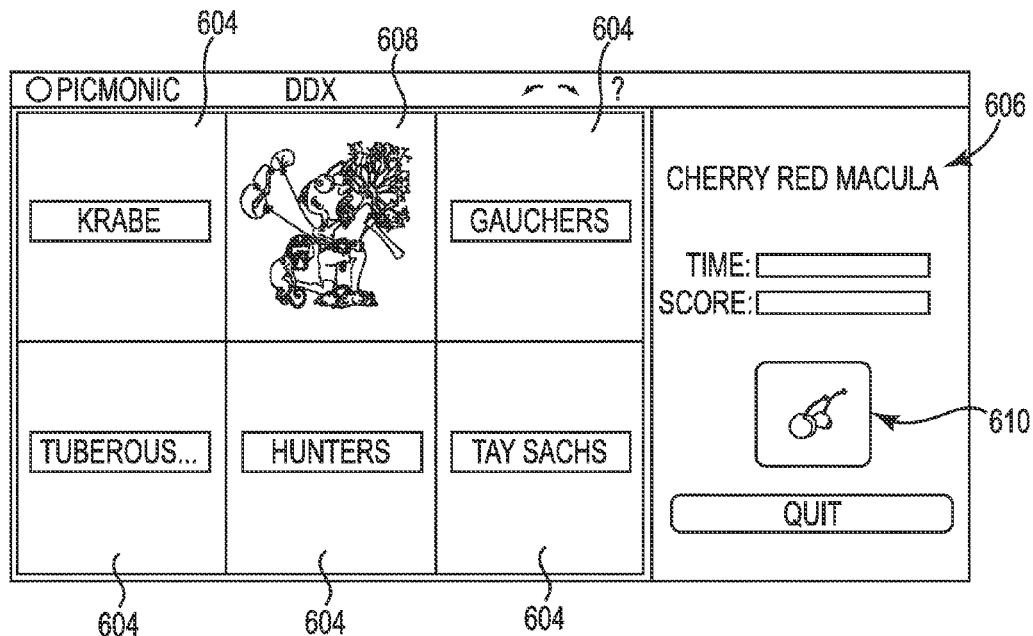

In various embodiments, a plurality of cards (e.g., six) are displayed on the screen in a grid region 602, without the corresponding pictorial mnemonics displayed, as shown in FIG. 16. Each of these cards can display topic text 604 in a quadrant or portion of the grid region 602, indicating the title or identifier of the topic (e.g., Krabbe's disease, Niemann-Pick disease, Tay-Sachs disease, etc.). An attribute region 606 can display an attribute that is the subject of the test. The attribute can be further displayed across portions of the grid region (FIG. 17) in certain embodiments. A user can compare the attribute identified or displayed in the region 606 (e.g., cherry red macula) and select via input the correct topic from the grid region 602 associated with the attribute, as depicted in FIG. 18. As a result of the input received for the selected topic in the grid region 602, an image of the topic and corresponding sub-images (e.g., the full pictorial mnemonic) 608 can be displayed, and an image, audio or other output can confirm whether the user selection was correct or incorrect. For instance, as shown in FIG. 18, the disease topic "Niemann-Pick disease" was correctly selected as the topic associated with the attribute "cherry red macula" for that particular quiz question. In situations where the user needs assistance, the user can select via input a hint selection area 610 that can provide text, images, media output, and the like, to provide either subtle or conclusive hints.

The game sessions can be timed in minutes and seconds to provide feedback to the users on how well they have mastered the material, and where they might need to spend more time with certain material and topics in the learn mode. Various scoring methods and scales can be employed and displayed based on the number of correct and incorrect answers provided by the user during the game session. One or more navigation options 612 (e.g., arrows) can be displayed to allow the user to provide input to navigate through the attributes, and/or shuffle the card topics in the grid region 602.

Figure 19:
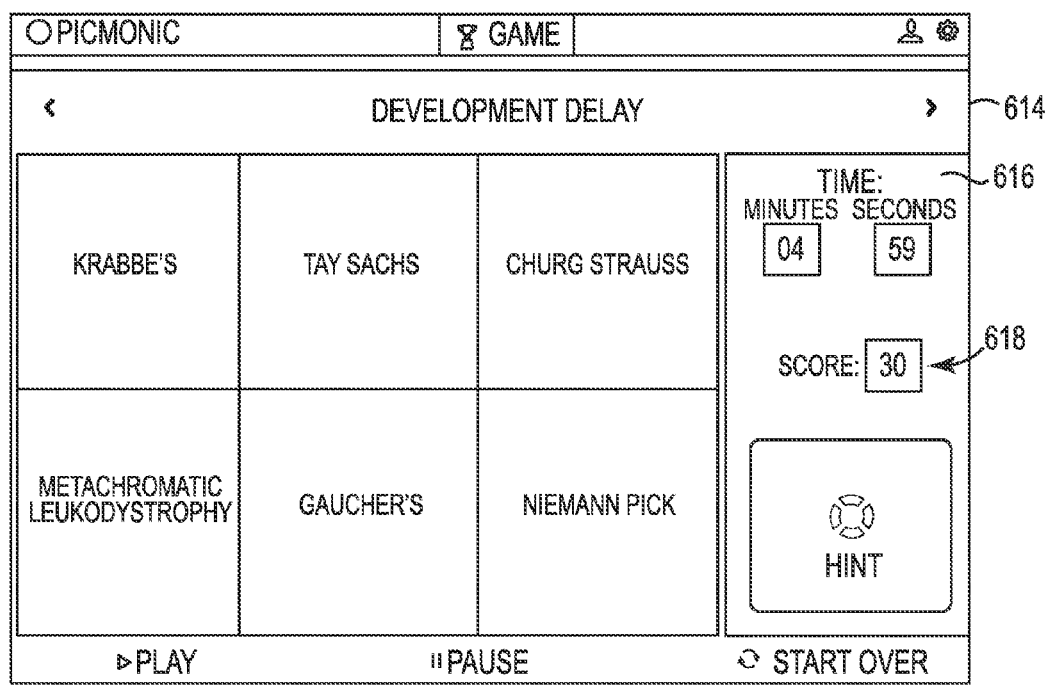

FIG. 19 shows an embodiment of the present invention in game mode 600, wherein the general category of topics is displayed in an identifier region 614, the topics are displayed in the grid region 602, and a timer 616, a score 618, and a hint option 610 is displayed in a tracking region 616.

Figure 20:
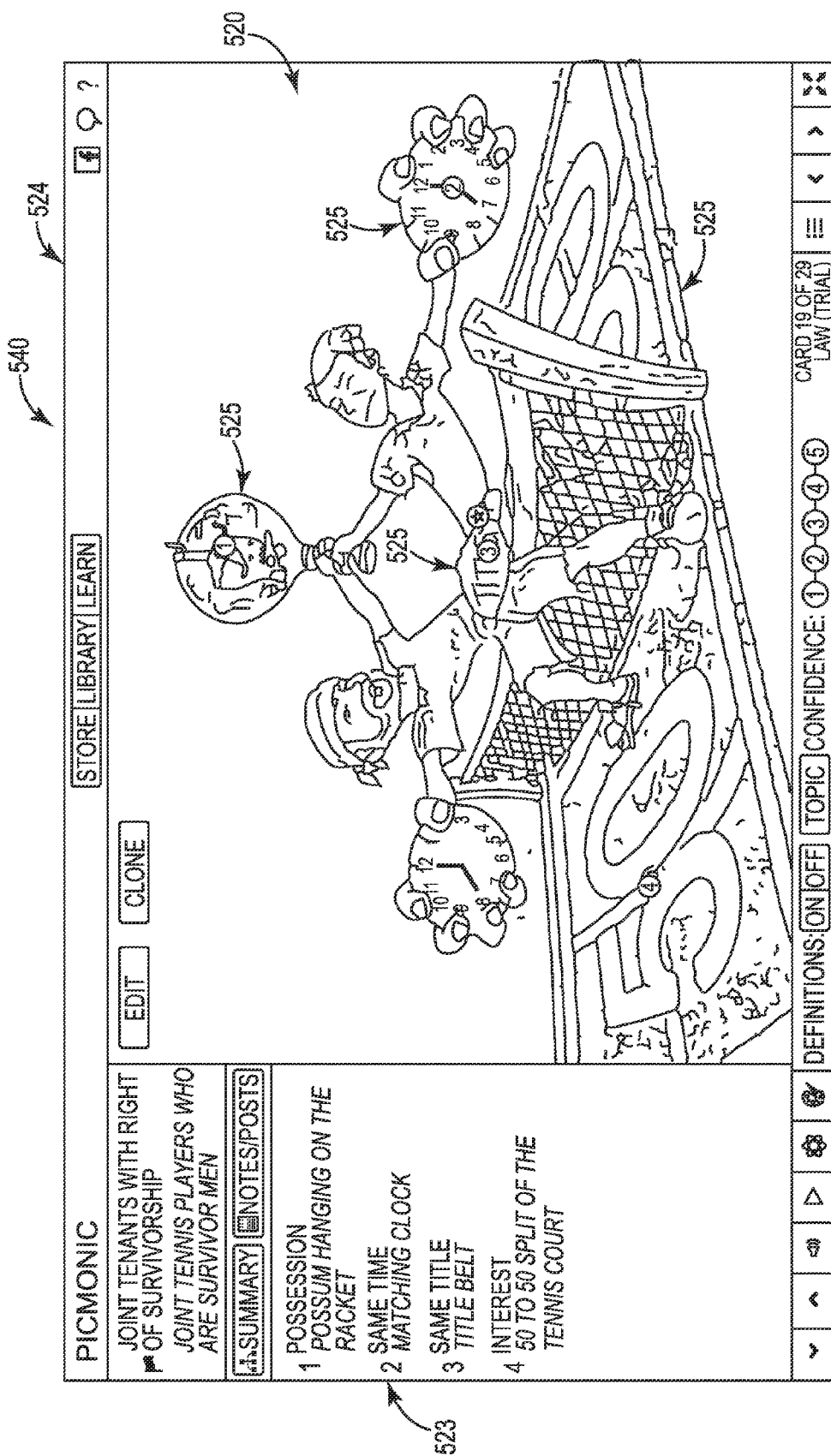
FIGS. 20-21 are images of learn mode screens in use, displaying non-medical content topics, in accordance with exemplary embodiments of the present invention.
Figure 21:
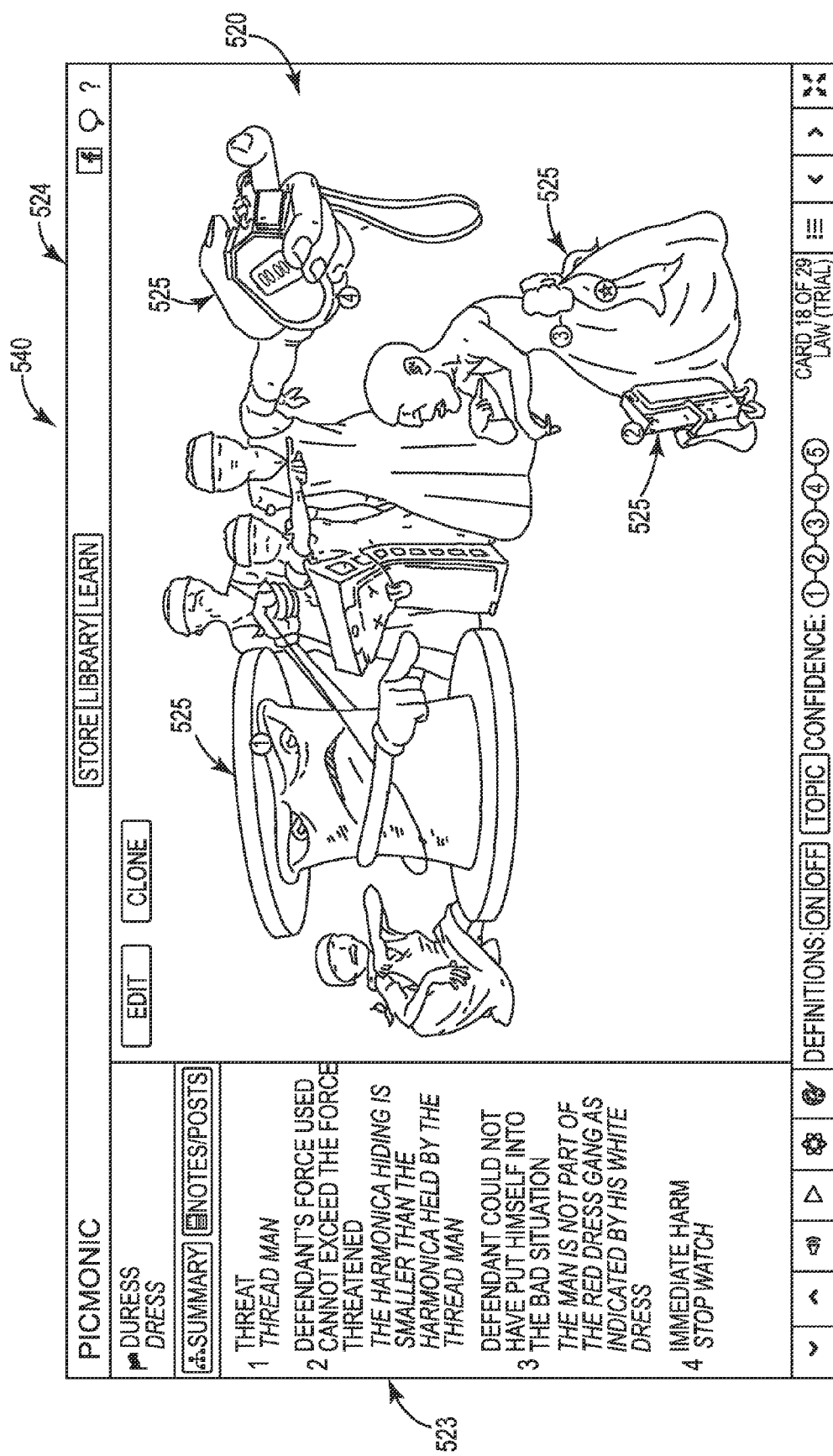

FIGS. 20-21 are images of learn mode screens in use, displaying non-medical content topics, sub-images, and attributes, in accordance with exemplary embodiments of the present invention.

In certain embodiments, user performance on one or more quizzes, and other user information, such as completed stacks and cards, and confidence meter summaries and details, can be saved and displayed, for the user (e.g., in the dashboard or user profile storage) of for an administrator.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

We claim:

1. A method for providing a learning aid using pictorial mnemonics, comprising:

Providing a library database including a plurality of content topics each assigned one or more sub-images and an attribute associated with each of the sub-images, wherein at least two of the content topics include a common sub-image and a common associated attribute;

receiving a first input on a user device, including a selection of one or more of the plurality of content topics from the library database;

displaying a first pictorial mnemonic image on the user device associated with the selected one or more content topics, wherein the first pictorial mnemonic includes one or more of the sub-images, and a list of one or more attributes;

receiving a second input on the user device including a selection of one of the one or more attributes; and displaying and highlighting on the user device, based on the second input, the selected one of the one or more attributes and the sub-image associated with the selected attribute.

2. The method of claim 1, further including displaying a description including the relationship between the selected topic, the sub-image and the selected attribute.

3. The method of claim 1, wherein the one or more attributes includes a plurality of sub-images.

4. The method of claim 1, wherein displaying the first pictorial mnemonic image associated with the selected one or more topics is provided in an image display region.

5. The method of claim 1, wherein displaying the list of one or more attributes is provided in an attribute region separate from the image display region.

6. The method of claim 1, further including displaying a control region.

7. The method of claim 6, wherein the control region includes at least an audio select.

8. The method of claim 7, wherein the audio select provides the user with one or more audio style formats for selection.

9. The method of claim 1, further including outputting an audio track in sequence with display highlighting of the one or more sub-images.

10. The method of claim 1, wherein the library database is provided remote from the user device.

11. A system for providing a learning aid using a pictorial mnemonic, comprising:

a processor;

a non-transitory memory coupled to the processor, including a library database including a plurality of content topics each assigned one or more sub-images and an attribute associated with each of the sub-images, wherein at least two of the content topics include a common sub-image and a common associated attribute;

an input device coupled to the processor;

an output device coupled to the processor; and wherein the processor is configured to:

receive from the input device a first input including a selection of a content topic;

display on the output device a first pictorial mnemonic associated with the selected content topic, wherein the first pictorial mnemonic comprises one or more of the sub-images, and one or more of the associated attributes;

receive from the input device a second input including a selection of one of the one or more sub-images; and display as highlighted on the output device, based on the second input, the selected one of the one or more sub-images and the attribute associated with the selected sub-image.

12. The system of claim 11, wherein the first pictorial mnemonic and the sub-images are displayed in an image display region.

13. The system of claim 11, wherein the attributes are displayed in an attribute region separate from the image display region.

14. The system of claim 11, wherein the processor is further configured to display a control region including at least an audio select.

15. The system of claim 14, wherein the audio select includes one or more audio style selects.

16. The system of claim 11, wherein processor is further configured to output an audio track in sequence with the selected one of the one or more sub-images.

17. The system of claim 11, wherein the library database is provided remote from the input device.

* * * * *